(12) United States Patent
Onozaki

(10) Patent No.: US 9,798,123 B2
(45) Date of Patent: Oct. 24, 2017

(54) ZOOM LENS SYSTEM

(71) Applicant: RICOH IMAGING COMPANY, LTD., Tokyo (JP)

(72) Inventor: Tatsuyuki Onozaki, Tokyo (JP)

(73) Assignee: RICOH IMAGING COMPANY, LTD., Tokyo (JP)

(*) Notice: Subject to any disclaimer, the term of this patent is extended or adjusted under 35 U.S.C. 154(b) by 0 days.

(21) Appl. No.: 15/251,406

(22) Filed: Aug. 30, 2016

(65) Prior Publication Data

US 2017/0068075 A1 Mar. 9, 2017

(30) Foreign Application Priority Data

Sep. 7, 2015 (JP) ................................ 2015-175544

(51) Int. Cl.
| | | |
|---|---|---|
| *G02B 15/14* | (2006.01) | |
| *G02B 13/18* | (2006.01) | |
| *G02B 9/60* | (2006.01) | |
| *G02B 15/173* | (2006.01) | |
| *G02B 27/00* | (2006.01) | |
| *G02B 13/00* | (2006.01) | |
| *G02B 9/00* | (2006.01) | |
| *G02B 5/00* | (2006.01) | |

(Continued)

(52) U.S. Cl.
CPC ....... *G02B 15/173* (2013.01); *G02B 27/0025* (2013.01); *G02B 5/005* (2013.01); *G02B 7/10* (2013.01); *G02B 9/00* (2013.01); *G02B 9/60* (2013.01); *G02B 13/009* (2013.01); *G02B 13/0045* (2013.01); *G02B 13/18* (2013.01); *G02B 15/14* (2013.01); *G02B 15/20* (2013.01); *H04N 5/2254* (2013.01)

(58) Field of Classification Search
CPC ...... G02B 13/0045; G02B 9/60; G02B 13/18; G02B 15/20; G02B 13/009; G02B 5/005; G02B 15/14; G02B 9/00; G02B 7/10; H04N 5/2254
USPC .......................... 359/683–686, 714, 740, 766
See application file for complete search history.

(56) References Cited

U.S. PATENT DOCUMENTS 5,585,969 A 12/1996 Endo
8,351,130 B2 * 1/2013 Fujisaki ............... G02B 13/009
359/683

(Continued)

FOREIGN PATENT DOCUMENTS

JP 7-151970 6/1995
JP 2002-131642 5/2002

(Continued)

*Primary Examiner* — Evelyn A Lester
(74) *Attorney, Agent, or Firm* — Greenblum & Bernstein, P.L.C.

(57) ABSTRACT

A zoom lens system includes a positive first lens group, a negative second lens group, a positive third lens group, a negative fourth lens group, and a positive fifth lens group, in that order from the object side. Upon zooming from the short to long focal length extremities, at least the first, third and fifth lens groups move in the optical axis direction. The second lens group includes at least four lens elements. Each of the third, fourth and fifth lens groups includes a plurality of lens elements. The following conditions (1) and (2) are satisfied:

$1.60 < f1/f5 < 2.46$            (1), and $-2.46 < f4/f3 < -1.80$            (2), wherein f1, f3, f4 and f5 designate the focal lengths of the first, third, fourth and fifth lens groups, respectively.

8 Claims, 29 Drawing Sheets

(51) Int. Cl.
G02B 15/20 (2006.01)
H04N 5/225 (2006.01)
G02B 7/10 (2006.01)

(56) References Cited

U.S. PATENT DOCUMENTS

| | | |
|---|---|---|
| 2006/0221460 A1 | 10/2006 | Saruwatari |
| 2007/0139794 A1 | 6/2007 | Misaka |
| 2008/0297913 A1 | 12/2008 | Saori |
| 2010/0296174 A1 | 11/2010 | Saori |
| 2012/0127582 A1 | 5/2012 | Obu et al. |

FOREIGN PATENT DOCUMENTS

| | | |
|---|---|---|
| JP | 2002-365547 | 12/2002 |
| JP | 2006-285021 | 10/2006 |
| JP | 2007-163964 | 6/2007 |
| JP | 2007-219315 | 8/2007 |
| JP | 2009-9121 | 1/2009 |
| JP | 2011-8234 | 1/2011 |
| JP | 2012-113028 | 6/2012 |
| JP | 2013-254160 | 12/2013 |

* cited by examiner

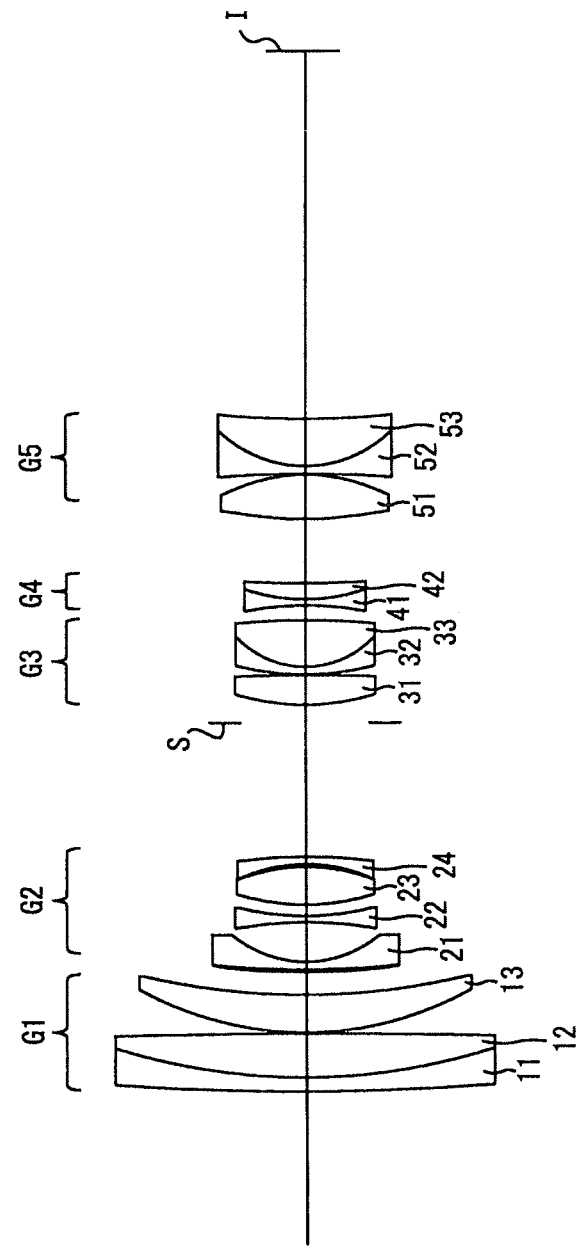

Fig. 2A
FNO.=1:3.6
d Line
g Line
C Line
-0.2  0.2
SPHERICAL
ABERRATION
CHROMATIC
ABERRATION
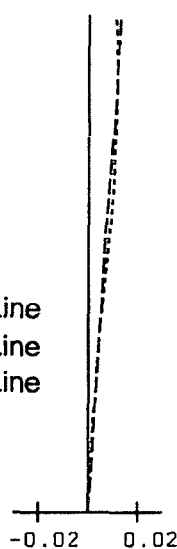
Fig. 2B
Y=21.64
-0.02  0.02
LATERAL
CHROMATIC
ABERRATION
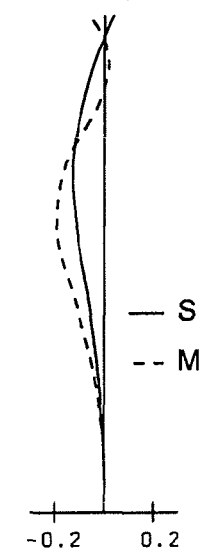
Fig. 2C
Y=21.64
— S
-- M
-0.2  0.2
ASTIGMATISM
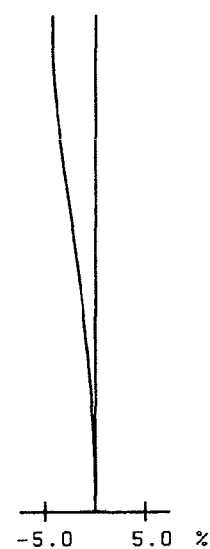
Fig. 2D
Y=21.64
-5.0  5.0 %
DISTORTION
Fig. 3A
Y= 0.00   +0.10
          -0.10
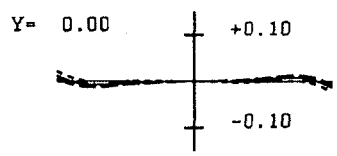
Fig. 3B
Y= 12.00  +0.10
          -0.10
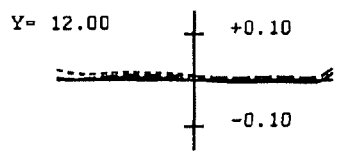
Fig. 3C
Y= 18.00  +0.10
          -0.10
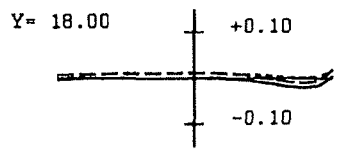
Fig. 3D
Y= 21.64  +0.10
          -0.10
d Line
g Line
C Line
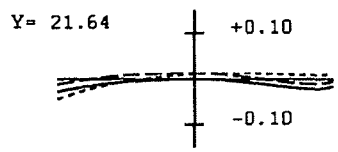

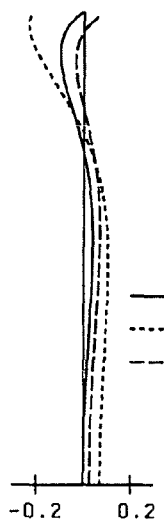
Fig. 5A
FNO.=1:5.3
——— d Line
········ g Line
----- C Line
-0.2  0.2
SPHERICAL
ABERRATION
CHROMATIC
ABERRATION
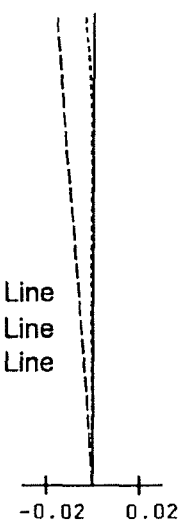
Fig. 5B
Y=21.64
-0.02  0.02
LATERAL
CHROMATIC
ABERRATION
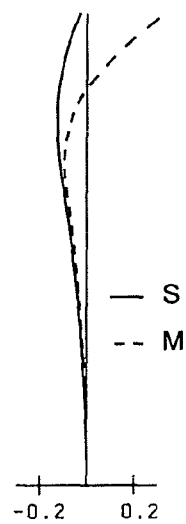
Fig. 5C
Y=21.64
——— S
--- M
-0.2  0.2
ASTIGMATISM
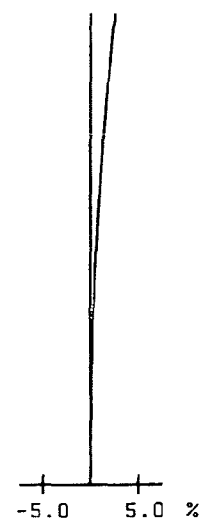
Fig. 5D
Y=21.64
-5.0  5.0 %
DISTORTION
Fig. 6A
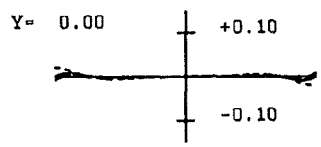
Y= 0.00    +0.10
           -0.10
Fig. 6B
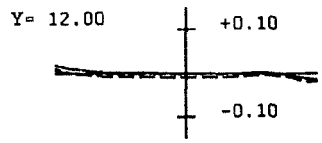
Y= 12.00   +0.10
           -0.10
Fig. 6C
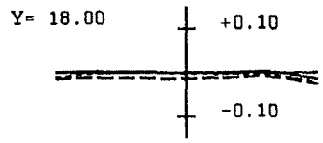
Y= 18.00   +0.10
           -0.10
Fig. 6D
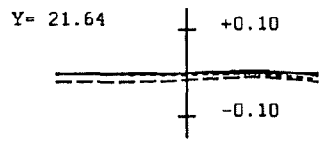
Y= 21.64   +0.10      ——— d Line
                      ········ g Line
           -0.10      ----- C Line

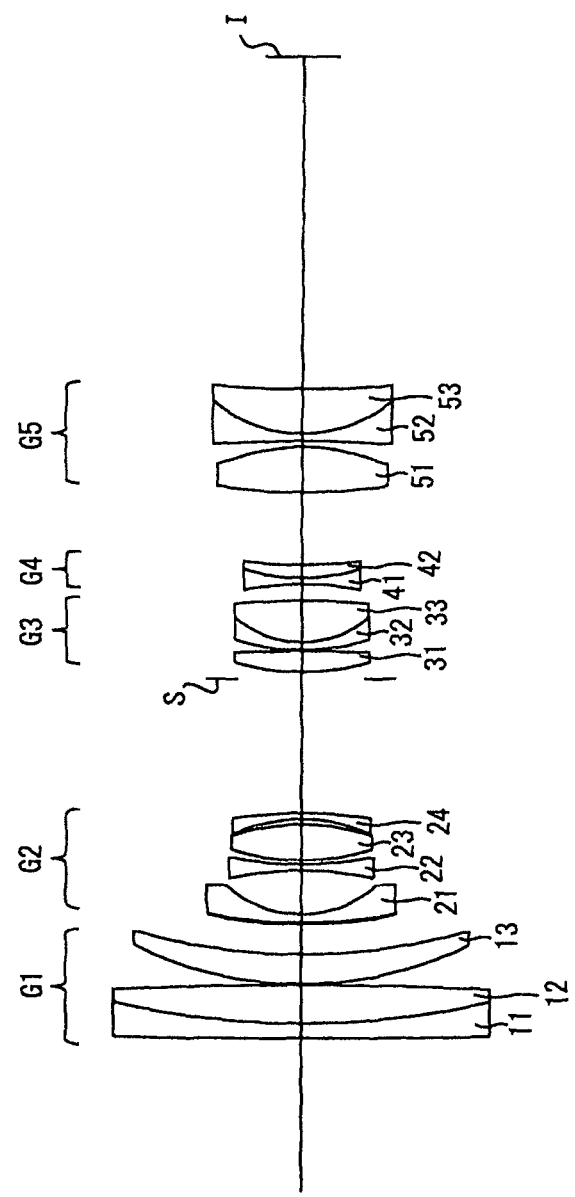

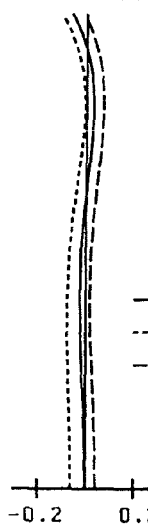
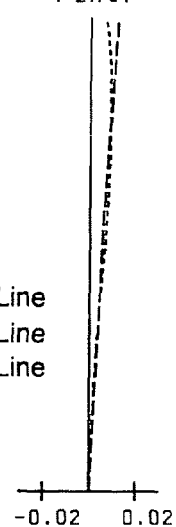
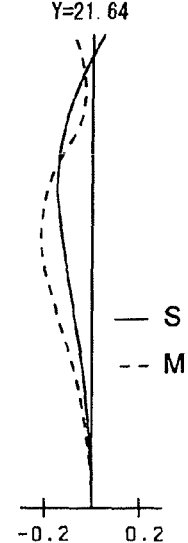
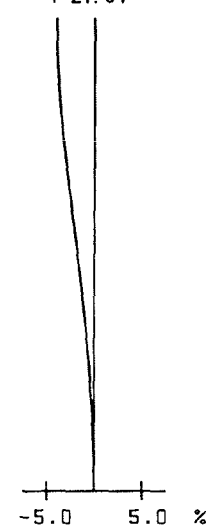
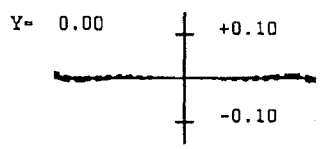
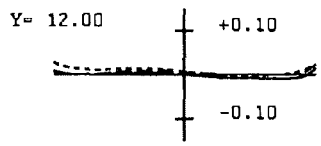
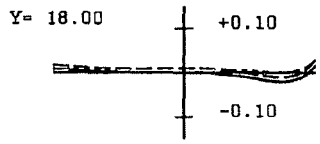
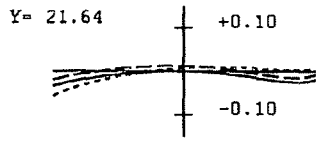

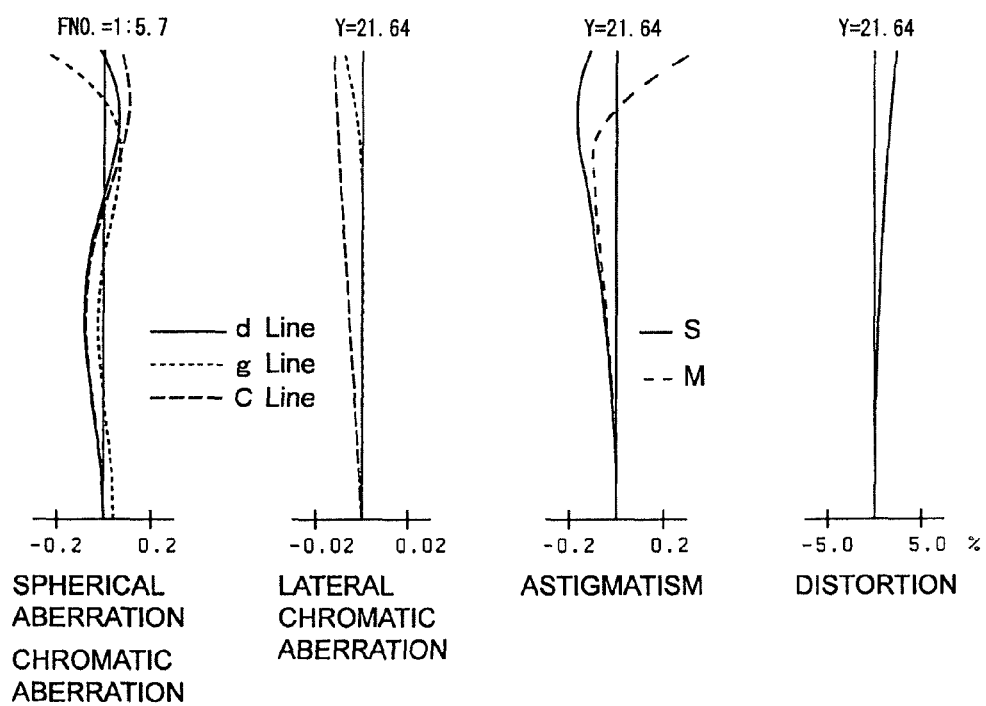ность

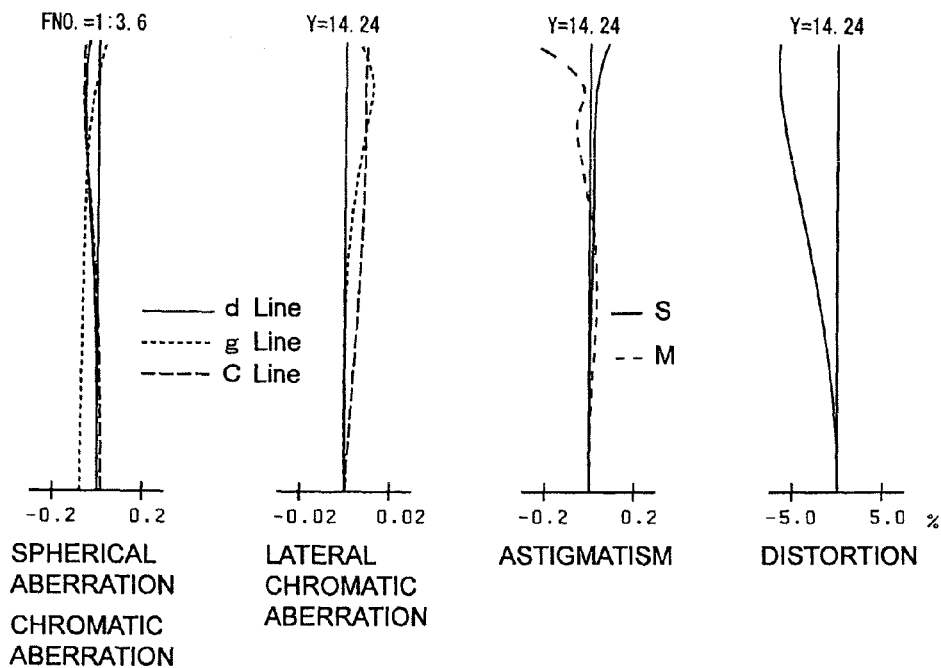

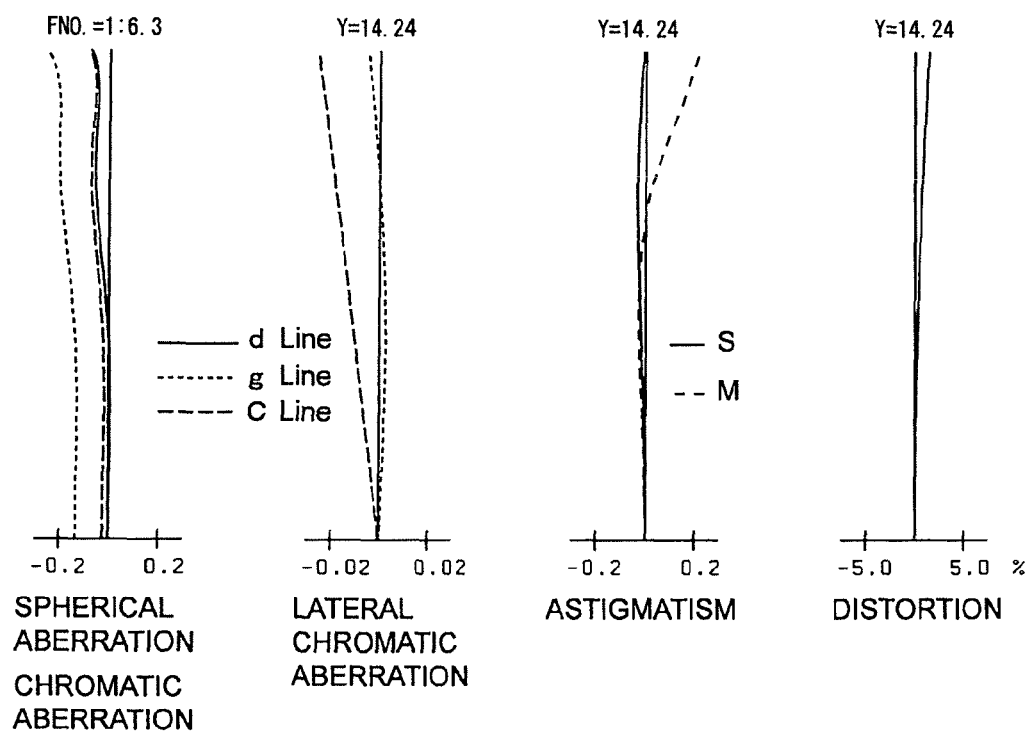
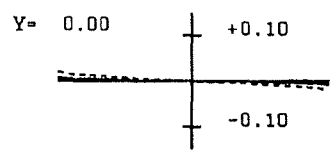
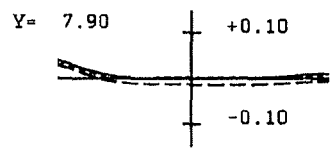
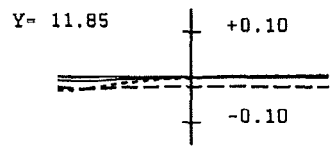
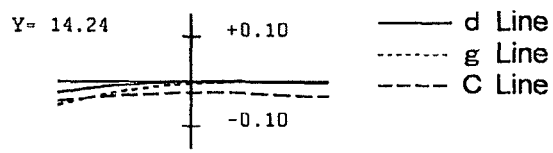

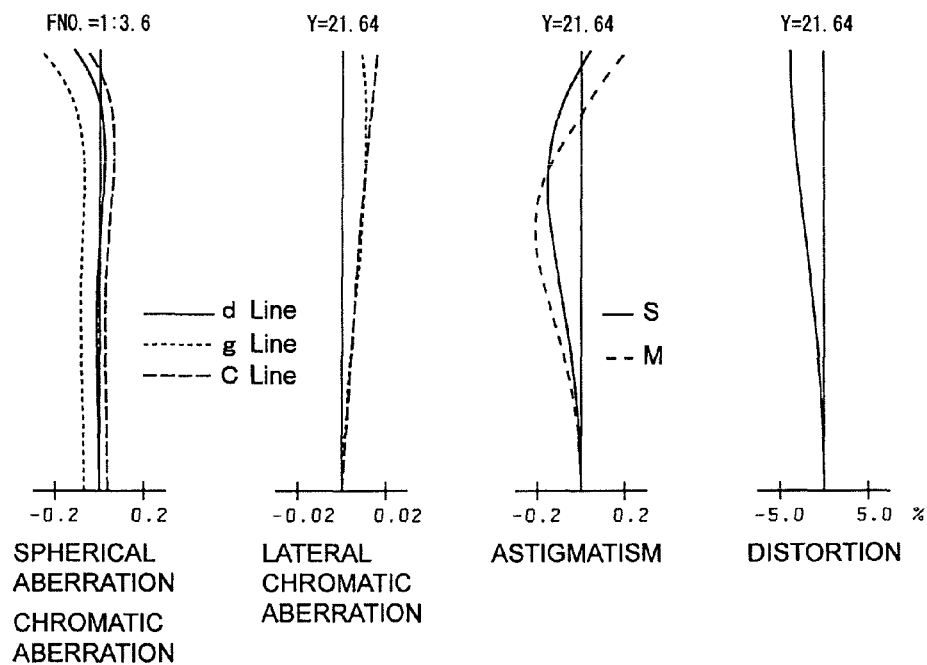
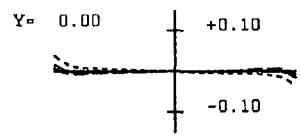
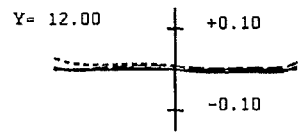
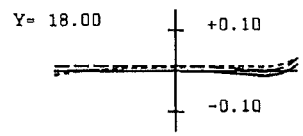
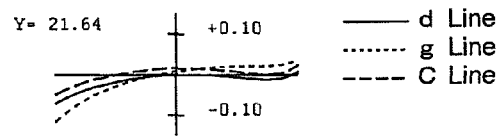

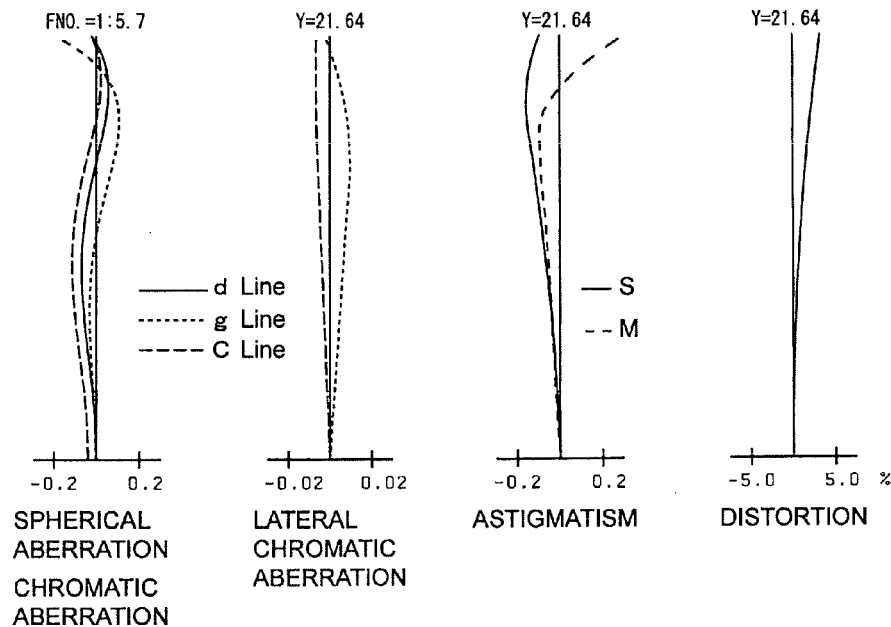

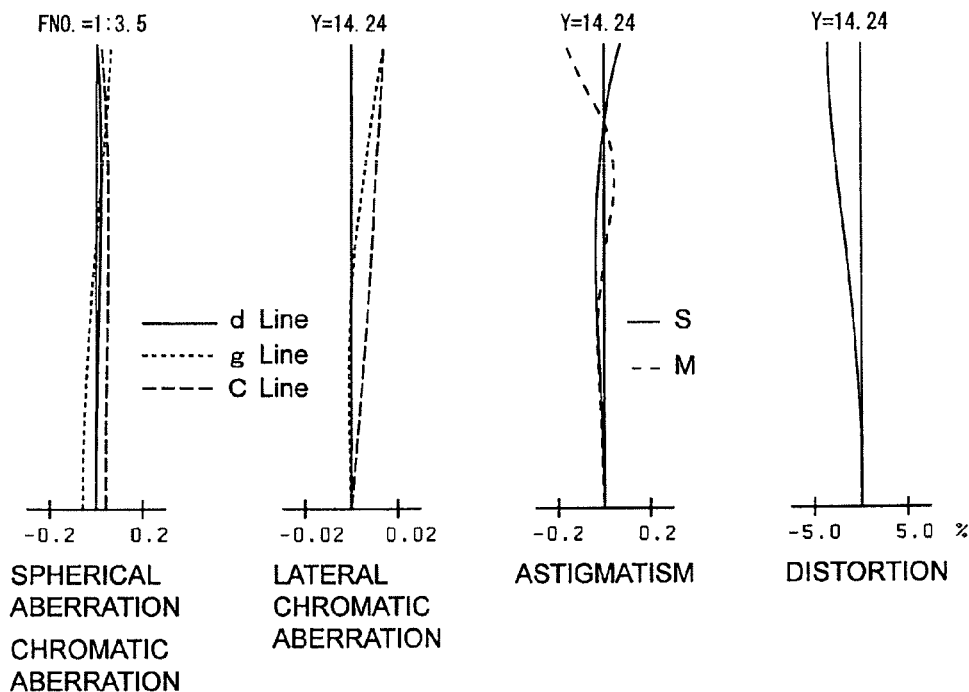

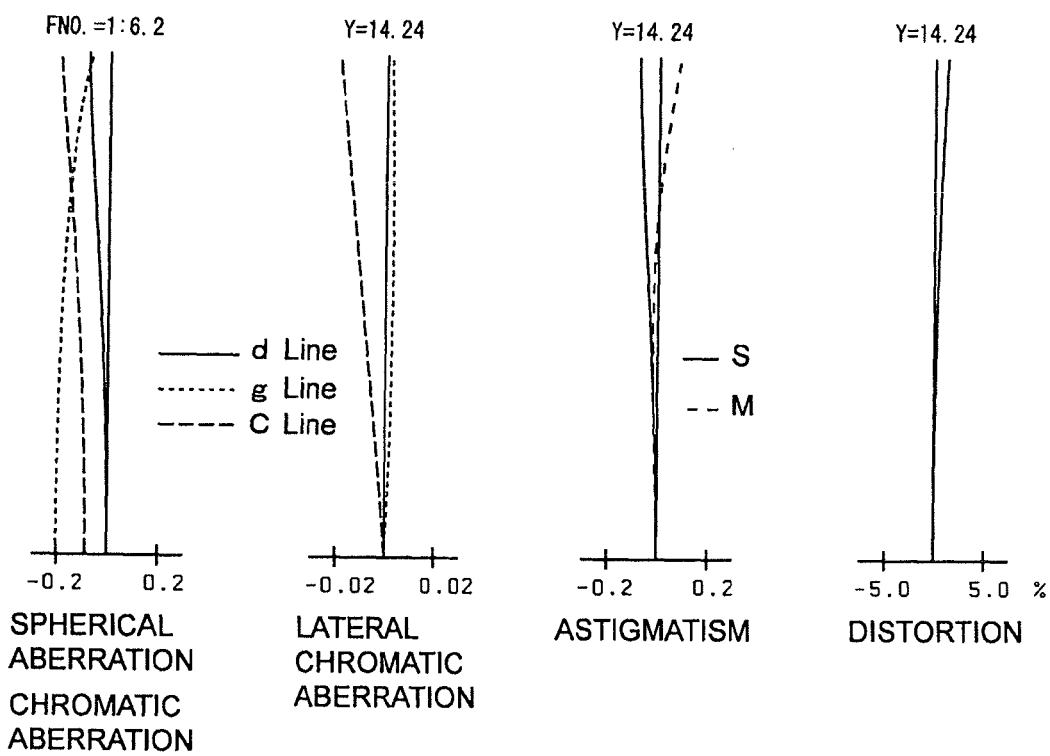
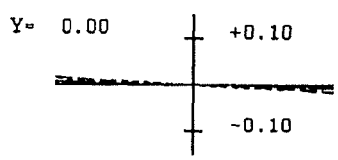
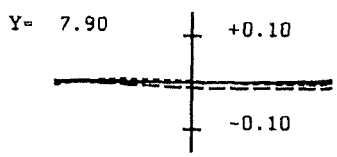
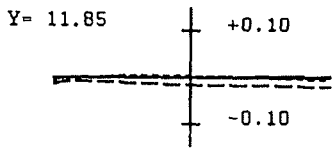
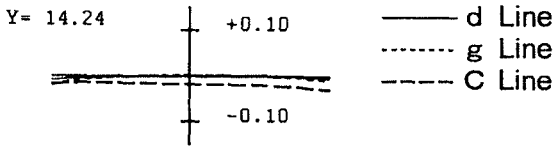

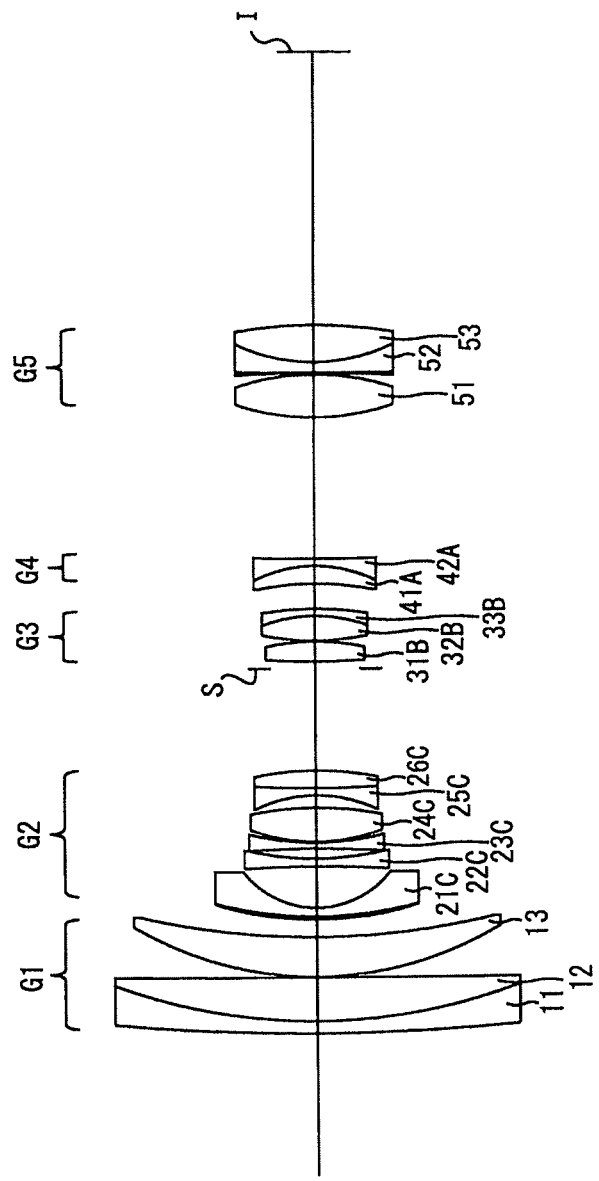

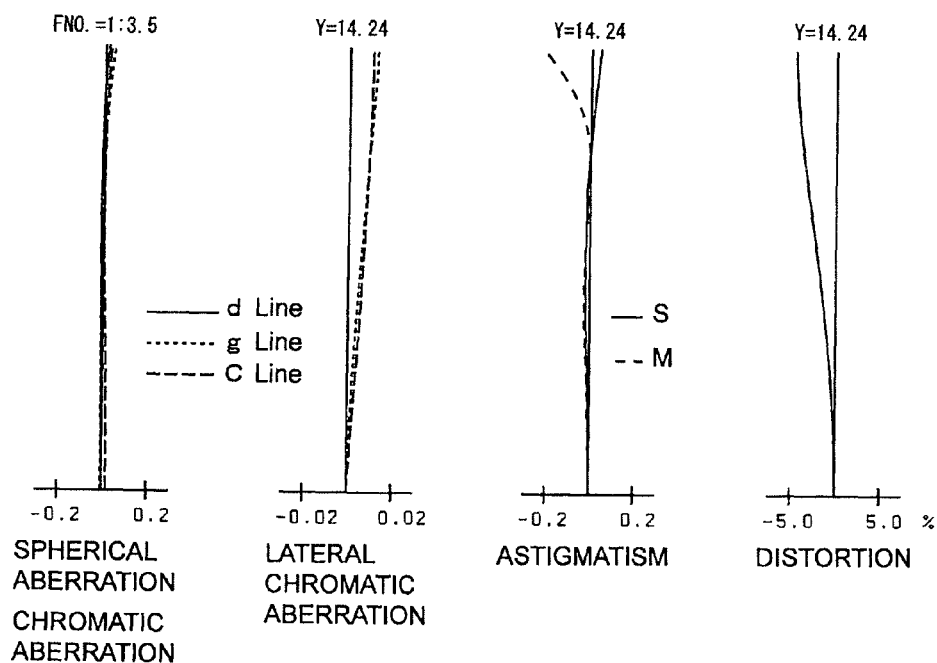
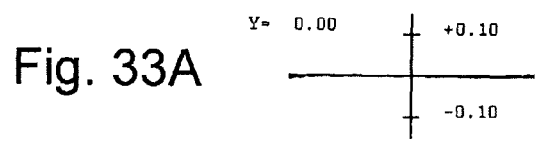
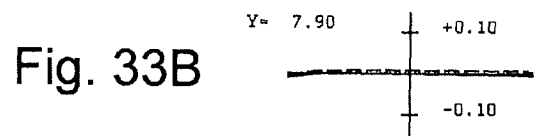
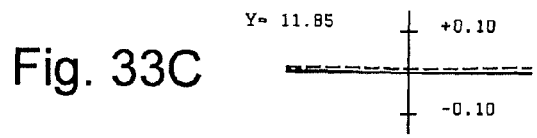
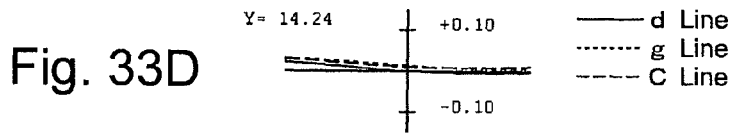

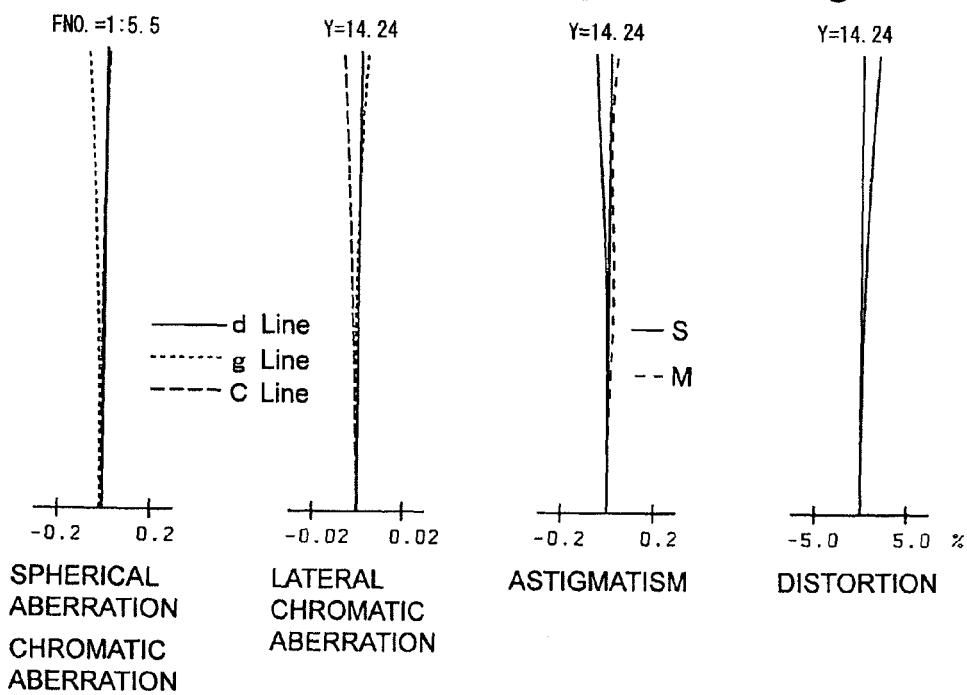

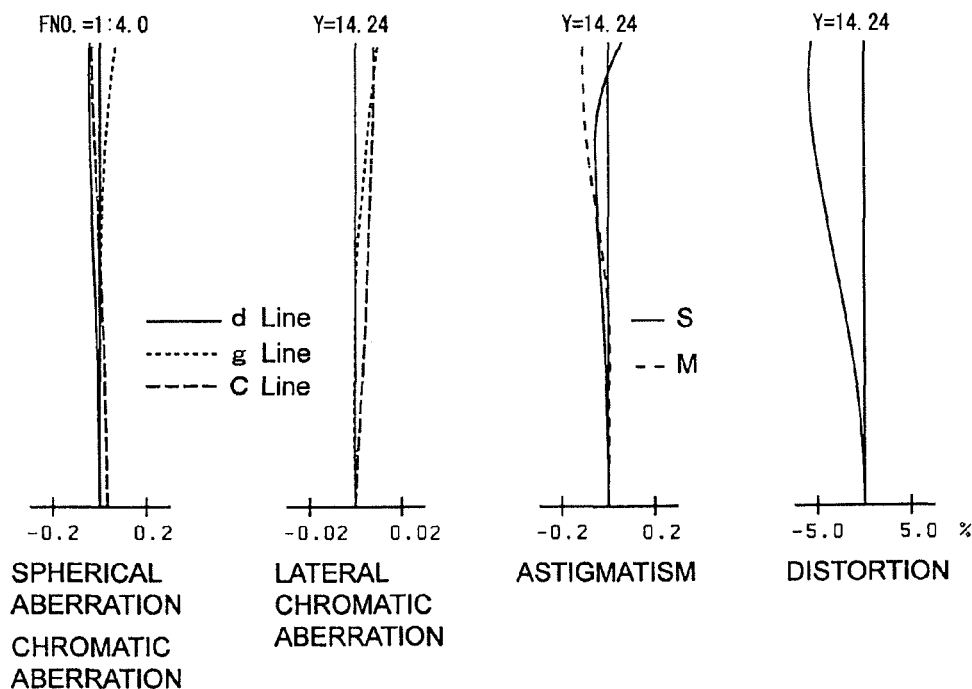

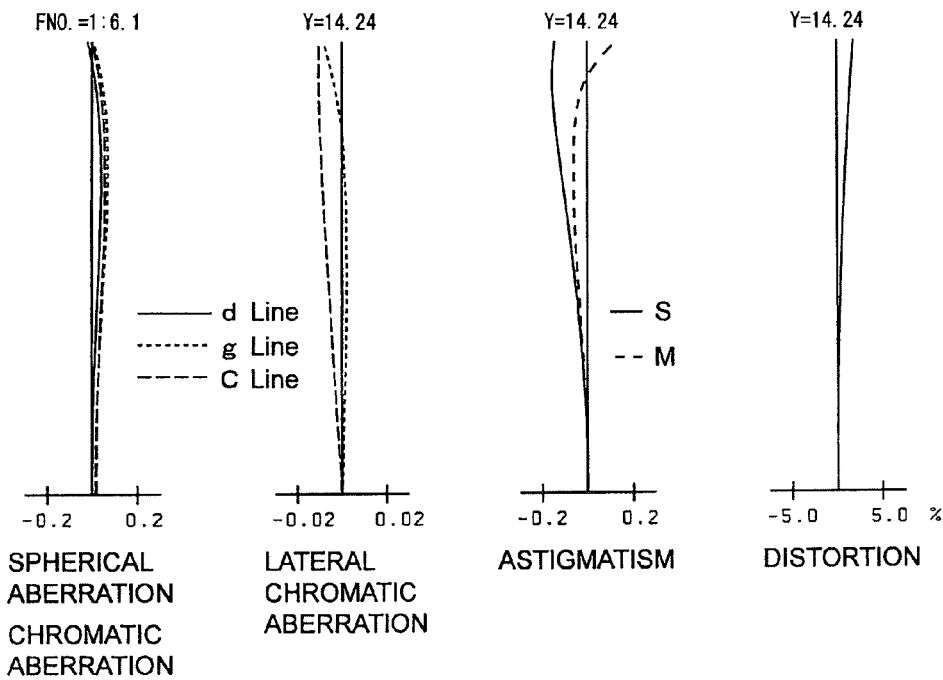

ZOOM LENS SYSTEM

BACKGROUND OF THE INVENTION

1. Field of the Invention

The present invention relates to a zoom lens system that is suitable for use in, e.g., an interchangeable-lens digital camera.

2. Description of Related Art

In the related art, zoom lens systems which are suitable for use in photographic cameras and electronic still cameras, etc., have been proposed. For example, Patent Literature Nos. 1 through 4 each disclose a positive-lead five-lens-group zoom lens system configured of a positive lens group, a negative lens group, a positive lens group, a negative lens group and positive lens group, in that order from the object side.

Such a positive-lead zoom lens system can have a reduced overall length at the wide-angle extremity (short focal length extremity) compared to a negative-lead zoom lens system. Furthermore, since a zoom lens system that is configured of five lens groups has an additional freedom with regard to the movement of the lens groups compared to that of a zoom lens system that is configured of four lens groups, aberration fluctuations that occur during zooming can be suppressed.

Whereas, e.g., in a zoom lens system for use in a interchangeable-lens digital camera of recent years, a high optical quality over the entire focal length range (zooming range) has been in demand.

Generally, in a zoom lens system, if the refractive power in a lens group that is used for zooming is increased, a large zoom ratio can be obtained within a predetermined movement amount of such a lens group; however, on the other hand, aberration fluctuations that occur during zooming increase, thereby making it difficult to attain a favorable optical quality over the entire focal length range (zooming range).

The following related art is also known: Japanese Unexamined Patent Publication no. H07-151970, Japanese Unexamined Patent Publication no. 2002-131642, Japanese Unexamined Patent Publication no. 2007-219315, and Japanese Unexamined Patent Publication no. 2009-009121.

The zoom lens systems of the above-mentioned related art also exhibit the problem of not being able to achieve a favorable optical quality over the entire focal Length range (zooming range) due to the refractive power of each lens group (refractive-power balance) being inappropriately set.

SUMMARY OF THE INVENTION

The present invention has been devised in view of the above-described problems, and provides a zoom lens system which can achieve a favorable optical quality over the entire focal length range (zooming range).

According to an aspect of the present invention, a zoom lens system is provided, including a positive first lens group, a negative second lens group, a positive third lens group, a negative fourth lens group, and a positive fifth lens group, in that order from the object side. Upon zooming from the short focal length extremity to the long focal length extremity, at least the first lens group, the third lens group and the fifth lens group move in the optical axis direction. The second lens group includes at least four lens elements. The third lens group includes a plurality of lens elements. The fourth lens group includes a plurality of lens elements. The fifth lens group includes a plurality of lens elements.

The following conditions (1) and (2) are satisfied:

$$1.60 < f1/f5 < 2.46 \quad (1), \text{ and}$$

$$-2.46 < f4/f3 < -1.80 \quad (2),$$

wherein f1 designates the focal length of the first lens group, f3 designates the focal length of the third lens group, f4 designates the focal length of the fourth lens group, and f5 designates the focal length of the fifth lens group.

It is desirable for the second lens group to include a negative lens element, a negative lens element, a positive lens element, and a negative lens element, in that order from the object side.

It is desirable for the second lens group to include a negative lens element, a negative lens element, a positive lens element, a negative lens element, and a positive lens element, in that order from the object side.

It is desirable for the second lens group to include a negative lens element, a negative lens element, a positive lens element, a negative lens element, and a negative lens element, in that order from the object side.

It is desirable for the second lens group to include a negative lens element, a negative lens element, a negative lens element, a positive lens element, a negative lens element, and a positive lens element, in that order from the object side.

It is desirable for the following condition (2') to be satisfied:

$$-2.20 < f4/f3 < -1.80 \quad (2'),$$

f3 designates the focal length of the third lens group, and f4 designates the focal length of the fourth lens group.

It is desirable for the second lens group to include a negative hybrid lens, provided closest to the object side within the second lens group, the hybrid lens including a glass lens element with an aspherical surface layer, formed of a synthetic resin material, formed on the object side thereof.

It is desirable for the fourth lens group to include a cemented lens having a positive lens element and a negative lens element.

According to the present invention, a zoom lens system which can achieve a favorable optical quality over the entire focal length range (zooming range) can be obtained.

The present disclosure relates to subject matter contained in Japanese Patent Application No. 2015-175544 (filed on Sep. 7, 2015) which is expressly incorporated herein in its entirety.

BRIEF DESCRIPTION OF THE DRAWINGS

The present invention will be discussed below in detail with reference to the accompanying drawings, in which:

FIG. 1 shows a lens arrangement of a zoom lens system of a first numerical embodiment, according to the present invention, when focused on an object at infinity at the short focal length extremity;

FIGS. 2A, 2B, 2C and 2D show various aberrations that occurred in the lens arrangement of FIG. 1;

FIGS. 3A, 3B, 3C and 3D show lateral aberrations that occurred in the lens arrangement of FIG. 1;

FIGS. 5A, 5B, 5C and 5D show various aberrations that occurred in the lens arrangement of FIG. 4;

FIGS. 6A, 6B, 6C and 6D show lateral aberrations that occurred in the lens arrangement of FIG. 4;

FIG. 7 shows a lens arrangement of a zoom lens system of a second numerical embodiment, according to the present invention, when focused on an object at infinity at the short focal length extremity;

FIGS. 8A, 8B, 8C and 8D show various aberrations that occurred in the lens arrangement of FIG. 7;

FIGS. 9A, 9B, 9C and 9D show lateral aberrations that occurred in the lens arrangement of FIG. 7;

FIGS. 11A, 11B, 11C and 11D show various aberrations that occurred in the lens arrangement of FIG. 10;

FIGS. 12A, 12B, 12C and 12D show lateral aberrations that occurred in the lens arrangement of FIG. 10;

FIGS. 14A, 14B, 14C and 14D show various aberrations that occurred in the lens arrangement of FIG. 13;

FIGS. 15A, 15B, 15C and 15D show lateral aberrations that occurred in the lens arrangement of FIG. 13;

FIGS. 17A, 17B, 17C and 17D show various aberrations that occurred in the lens arrangement of FIG. 16;

FIGS. 18A, 18B, 18C and 18D show lateral aberrations that occurred in the lens arrangement of FIG. 16;

FIGS. 20A, 20B, 20C and 20D show various aberrations that occurred in the lens arrangement of FIG. 19;

FIGS. 21A, 21B, 21C and 21D show lateral aberrations that occurred in the lens arrangement of FIG. 19;

FIGS. 23A, 23B, 23C and 23D show various aberrations that occurred in the lens arrangement of FIG. 22;

FIGS. 24A, 24B, 24C and 24D show lateral aberrations that occurred in the lens arrangement of FIG. 22;

FIGS. 26A, 26B, 26C and 26D show various aberrations that occurred in the lens arrangement of FIG. 25;

FIGS. 27A, 27B, 27C and 27D show lateral aberrations that occurred in the lens arrangement of FIG. 25;

FIGS. 29A, 29B, 29C and 29D show various aberrations that occurred in the lens arrangement of FIG. 28;

FIGS. 30A, 30B, 30C and 30D show lateral aberrations that occurred in the lens arrangement of FIG. 28;

FIG. 31 shows a lens arrangement of a zoom lens system of a sixth numerical embodiment, according to the present invention, when focused on an object at infinity at the short focal length extremity;

FIGS. 32A, 32B, 32C and 32D show various aberrations that occurred in the lens arrangement of FIG. 31;

FIGS. 33A, 33B, 33C and 33D show lateral aberrations that occurred in the lens arrangement of FIG. 31;

FIGS. 35A, 35B, 35C and 35D show various aberrations that occurred in the lens arrangement of FIG. 34;

FIGS. 36A, 36B, 36C and 36D show lateral aberrations that occurred in the lens arrangement of FIG. 34;

FIGS. 38A, 38B, 38C and 38D show various aberrations that occurred in the lens arrangement of FIG. 37;

FIGS. 39A, 39B, 39C and 39D show lateral aberrations that occurred in the lens arrangement of FIG. 37;

FIGS. 41A, 41B, 41C and 41D show various aberrations that occurred in the lens arrangement of FIG. 40;

FIGS. 42A, 42B, 42C and 42D show lateral aberrations that occurred in the lens arrangement of FIG. 40;

DESCRIPTION OF THE EMBODIMENTS

Figure 43:
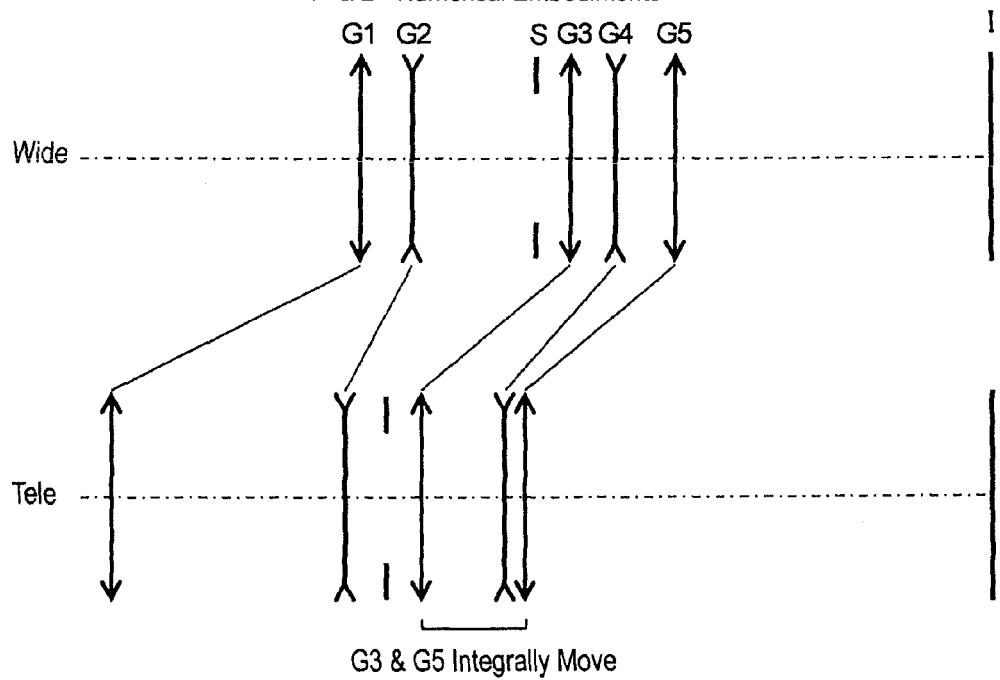
FIG. 43 is a first zoom path diagram showing a zoom path of the zoom lens system according to the present invention.
Figure 44:
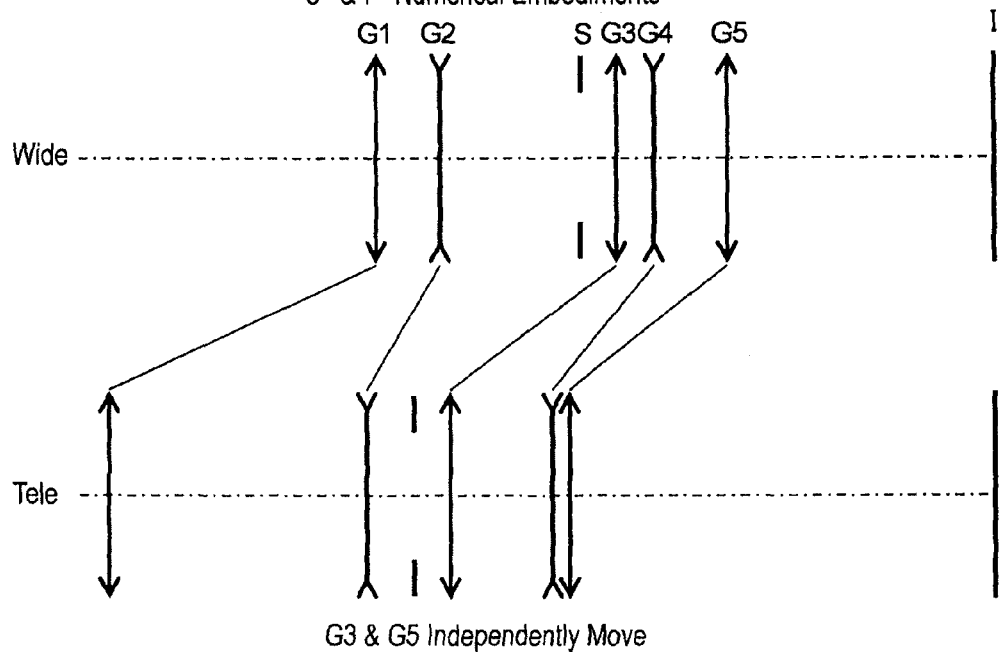
FIG. 44 is a second zoom path diagram showing a zoom path of the zoom lens system according to the present invention.

As shown in the zoom path diagrams of FIGS. 43 and 44, the zoom lens system in each of the first through seventh numerical embodiments is configured of a positive first lens group G1, a negative second lens group G2, a positive third lens group G3, a negative fourth lens group G4 and a positive fifth lens group G5, in that order from the object side. A diaphragm S is provided between the second lens group G2 and the third lens group G3 (immediately in front of the third lens group G3) and moves integrally with the third lens group G3. "I" designates an imaging plane.

As shown in the zoom path diagrams of FIGS. 43 and 44, the zoom lens system in each of the first through seventh numerical embodiments, the first through fifth lens groups G1 through G5 move (advance) toward the object side when zooming from the short focal length extremity (Wide) to the long focal length extremity (Tele). Thereupon, the distance between the first lens group G1 and the second lens group G2 increases, the distance between the second lens group G2 and the third lens group G3 decreases, the distance between the third lens group G3 and the fourth lens group G4 increases, and the distance between the fourth lens group G4 and the fifth lens group G5 decreases.

In the first and second numerical embodiments, the third lens group G3 and the fifth lens group G5 integrally move (advance) toward the object side upon zooming from the short focal length extremity to the long focal length extremity, as shown in the zoom path of FIG. 43. According to this configuration, the mechanical structure of the lens barrel (in which the zoom lens system is provided) can be simplified, thereby suppressing costs. Furthermore, such a configuration is advantageous for maintaining a practical optical quality due to a decrease in possible causes for manufacturing error.

In the third through seventh numerical embodiments, the third lens group G3 and the fifth lens group G5 independently move (advance) toward the object side upon zooming from the short focal length extremity to the long focal length extremity, as shown in the zoom path of FIG. 44. According to this configuration, an additional degree of freedom with regard to the movement of the lens groups that contribute to zooming can be provided, which is advantageous with respect to correcting aberration fluctuations that occur during zooming.

Hence, the present invention can be applied to either a zoom lens system in which the third lens group G3 and the fifth lens group G5 integrally move, or to a zoom lens system in which the third lens group G3 and the fifth lens group independently move.

Furthermore, in the zoom lens system of each of the first through seventh numerical embodiments, it is only required for at least the first lens group G1, the third lens group G3 and the fifth lens group G5 to move in the optical axis direction during zooming from the short focal length extremity to the long focal length extremity. In other words, the second lens group G2 and the fourth lens group G4 have a certain degree of freedom in movement (behavior) during zooming from the short focal length extremity to the long focal length extremity; for example, an embodiment is possible in which at least one of the second lens group G2 and the fourth lens group G4 does not move in the optical axis direction (remaining stationary relative to the imaging plane I), or an embodiment is possible in which at least one of the second lens group G2 and the fourth lens group G4 first moves in the optical axis direction and thereafter returns (e.g., U-turns) to the same position as that at the short focal length extremity, etc.

In each of the first through seventh numerical embodiments, the first lens group G1 is configured of a cemented lens having a negative lens element 11 and a positive lens element 12; and a positive lens element 13, in that order from the object side.

In each of the first, second, fourth and seventh numerical embodiments, the second lens group G2 is configured of a negative lens element 21, a negative lens element 22, a positive lens element 23, and a negative lens element 24, in that order from the object side. In each of the first, second and fourth numerical embodiments, the negative lens element 21 is configured as a hybrid lens formed of a glass lens element with an aspherical lens layer (formed of a synthetic resin material) cemented onto the surface on the object side thereof; whereas, in the seventh numerical embodiment, the negative lens element 21 is configured of a spherical surfaced lens element, i.e., not a hybrid lens.

In the third numerical embodiment, the second lens group G2 is configured of a negative lens element 21A, a negative lens element 22A, a positive lens element 23A; and a cemented lens having a negative lens element 24A and a positive lens element 25A, in that order from the object side.

In the fifth numerical embodiment, the second lens group G2 is configured of a negative lens element 21B, a negative lens element 22B; a cemented lens having a positive lens element 23B and a negative lens element 24B; and a negative lens element 25B, in that order from the object side. The negative lens element 21B is a hybrid lens configured of a glass lens element with an aspherical surface layer, formed of a synthetic resin material, formed on the object side thereof.

In the sixth numerical embodiment, the second lens group G2 is configured of a negative lens element 21C, a negative lens element 22C, a negative lens element 23C, a positive lens element 24C; and a cemented lens having a negative lens element 25C and a positive lens element 26C, in that order from the object side. The negative lens element 21C is a hybrid lens configured of a glass lens element with an aspherical surface layer, formed of a synthetic resin material, formed on the object side thereof.

In each of the first through fourth numerical embodiments, the third lens group G3 is configured of a positive lens element 31; and a cemented lens having a negative lens element 32 and a positive lens element 33, in that order from the object side. In the third numerical embodiment, the positive lens element 31 has an aspherical surface formed on the image side thereof.

In the fifth numerical embodiment, the third lens group G3 is configured of a positive lens element 31A, positive lens element 32A; and a cemented lens having a positive lens element 33A and a negative lens element 34A, in that order from the object side.

In the sixth numerical embodiment, the third lens group G3 is configured of a positive lens element 31B; and a cemented lens having a positive lens element 32B and a negative lens element 33B, in that order from the object side.

In the seventh numerical embodiment, the third lens group G3 is configured of a cemented lens having a negative lens element 31C and a positive lens element 32C; and a cemented lens having a positive lens element 33C and a negative lens element 34C, in that order from the object side.

In the first through fifth and seventh numerical embodiments, the fourth lens group G4 is configured of a cemented lens having a negative lens element 41 and a positive lens element 42, in that order from the object side.

In the sixth numerical embodiment, the fourth lens group G4 is configured of the cemented lens having a positive lens element 41A and a negative lens element 42A, in that order from the object side.

In the first, second and fourth through sixth numerical embodiments, the fifth lens group G5 is configured of a positive lens element 51; and a cemented lens having a negative lens element 52 and a positive lens element 53, in that order from the object side. In the first, second and fourth numerical embodiments, the positive lens element 51 is provided with an aspherical surface on each side thereof. In the fifth numerical embodiment, the positive lens element 51 is provided with an aspherical surface on the object side thereof. In the sixth numerical embodiment, the positive lens element 51 is not provided with an aspherical surface (each side is formed as a spherical surface). In the sixth numerical embodiment, the negative lens element 52 is a hybrid lens configured of a glass lens element having an aspherical surface layer, formed of a synthetic resin, formed on the object side thereof.

In the third and seventh numerical embodiment, the fifth lens group G5 is configured of a positive lens element 51A; and a cemented lens having a positive lens element 52A and a negative lens element 53A, in that order from the object side. The positive lens element 51A is provided with an aspherical surface on each side thereof.

The zoom lens system of each illustrated embodiment is a positive-lead zoom lens system having five lens groups, i.e., configured of a positive lens group, a negative lens group, a positive lens group, a negative lens group, and a positive lens group, in that order from the object side. According to such a configuration, the overall length of the zoom lens system at the short focal length extremity can be reduced (shortened) compared to that of a negative-lead zoom lens system; furthermore, such a configuration also has added freedom for the movable lens groups compared to a zoom lens system having four lens groups, so that aberration fluctuations that occur during zooming can be suppressed.

Furthermore, in the zoom lens system of each numerical embodiment, the second lens group G2 is provided with four or more lens elements, and each of the third lens group G3, the fourth lens group G4 and the fifth lens group G5 are configured of a plurality of lens elements. According to this configuration, additional freedom for correction of spherical aberration, coma and chromatic aberration is achieved for each lens group, thereby achieving a favorable optical quality.

Furthermore, in the zoom lens system of each numerical embodiment, by optimally determining the refractive power distribution (refractive power balance) of each lens group, aberration fluctuations that occur during zooming can be successfully suppressed so that a favorable optical quality can be achieved over the entire focal length range (zooming range), and the structure of the lens barrel (in which the zoom lens system of the present invention is provided) can be simplified, thereby achieving a reduction in costs.

Condition (1) specifies the ratio of the refractive power of the first lens group G1 to that of the fifth lens group G5. By satisfying condition (1), abaxial aberrations such as distortion and field curvature, etc., can be favorably corrected; furthermore, an increase the overall length of the zoom lens system at the short focal length extremity and an increase in the amount of movement of the first lens group G1 during zooming can be suppressed, so that a favorably optical quality can be achieved over the entire focal length range (zooming range) while simplifying the structure of the lens barrel (in which the zoom lens system of the present invention is provided), thereby achieving a reduction in costs.

If the upper limit of condition (1) is exceeded, the entire length of the zoom lens system at the short focal length extremity increases, and the amount of movement of the first lens group G1 during zooming from the short focal length extremity to the long focal length extremity increases. Accordingly, the lens barrel structure for supporting the zoom lens system increases in size and increases in complexity, thereby resulting in increased costs.

If the lower limit of condition (1) is exceeded, the ratio of the refractive powers of the first lens group G1 and the fifth lens group G5, which are arranged at positions that are mutually far away from the diaphragm S, becomes inappropriate, so that correction of abaxial aberrations such as distortion and field curvature, etc., becomes insufficient.

Conditions (2) and (2') specify the ratio of the refractive power of the third lens group G3 to that of the fourth lens group G4. By satisfying condition (2), aberration fluctuations that occur during zooming (e.g., spherical aberration and field curvature) can be suppressed, while simplifying the lens barrel structure to thereby achieved a reduction in costs. This functional effect becomes even more prominent if condition (2') is satisfied.

If the upper limits of conditions (2) and (2') are exceeded, the refractive power distribution of the third lens group G3 and the fourth lens group G4 for correcting aberration fluctuations that occur during zooming become inappropriate, so that fluctuations in spherical aberration and field curvature during zooming increase.

If the lower limit of condition (2') is exceeded, the movement amount of the first lens group G1 upon zooming from the short focal length extremity to the long focal length extremity increases. Accordingly, the lens barrel structure becomes more complicated in order to suppress decentration of the first lens group G1 that occurs due to the first lens group G1 being advanced (in a direction toward the object side), thereby resulting in increased costs.

In the zoom lens system of the third, fifth and sixth numerical embodiments, the second lens group G2 is configured of five or more lens elements (21A through 25A, 21B through 25B, and 21C through 26C). Hence, additional freedom for correcting aberrations is achieved by increasing the number of lens elements in the second lens group G2.

In the zoom lens system of the first, second, fourth and seventh numerical embodiments, the second lens group G2 is configured of a negative meniscus lens element 21 provided with a convex surface on the object side, a biconcave negative lens element 22, a biconvex positive lens element 23, and a negative lens element 24 provided with a concave surface on the object side, in that order from the object side. By configuring the second lens group G2 in such a manner, spherical aberration, coma and chromatic aberration, etc., can be favorably corrected, and a reduction in costs can be achieved by configuring the second lens group G2 of four lens elements.

By forming the surface on the object side of the negative lens element 21 that is closest to the object side within the second lens group G2 as a convex surface, occurrence of spherical aberration can be suppressed. By forming the surface on the object side of the negative lens element 22 as a concave surface, spherical aberration and coma can be favorably corrected. The negative Petzval sum and the lateral chromatic aberration occurring at the negative lens elements 21 and 22 can be corrected by the positive lens element 23. By forming a concave surface on the surface on the object side of the negative lens element 24, astigmatism and lateral chromatic aberration can be favorably corrected.

An air space (air lens) exists between the negative lens element 22 and the positive lens element 23; accordingly, additional freedom in correction of spherical aberration can be achieved.

In each numerical embodiment of the zoom lens system, the fourth lens group G4 is configured of a cemented lens having a negative lens element 41 and a positive lens element 42, in that order from the object side; or is configured of a cemented lens having a positive lens element 41A and a negative lens element 42A, in that order from the object side. Accordingly, fluctuation of chromatic aberration and field curvature occurring during zooming can be suppressed. Correction of chromatic aberration becomes especially facilitated.

Specific first through seventh numerical embodiments will be herein discussed. In the aberration diagrams, lateral aberration diagrams and the tables, the d-line, g-line and C-line show aberrations at their respective wave-lengths; S designates the sagittal image, M designates the meridional image, FNO. designates the f-number, f designates the focal length of the entire optical system, W designates the half angle of view (°), Y designates the image height, fB designates the backfocus, L designates the overall length of the lens system, R designates the radius of curvature, d designates the lens thickness or distance between lenses, N(d) designates the refractive index at the d-line, and vd designates the Abbe number with respect to the d-line. The values for the f-number, the focal length, the half angle-of-view, the image height, the backfocus, the overall length of the lens system, and the distance between lenses (which changes during zooming) are shown in the following order: short focal length extremity, intermediate focal length, and long focal length extremity. The unit used for the various lengths is defined in millimeters (mm).

An aspherical surface which is rotationally symmetrical about the optical axis is defined as:

$$x = cy^2/(1+[1-\{1+K\}c^2y^2]^{1/2}) + A4y^4 + A6y^6 + A8y^8 + A10y^{10} + A12y^{12}$$

wherein 'c' designates the curvature (1/r) of the aspherical vertex, 'y' designates the distance from the optical axis, 'K' designates the conic coefficient, A4 designates a fourth-order aspherical coefficient, A6 designates a sixth-order aspherical coefficient, A8 designates an eighth-order aspherical coefficient, A10 designates a tenth-order aspherical coefficient, A12 designates a twelfth-order aspherical coefficient, and 'x' designates the amount of sag.

Embodiment 1

Figure 4:
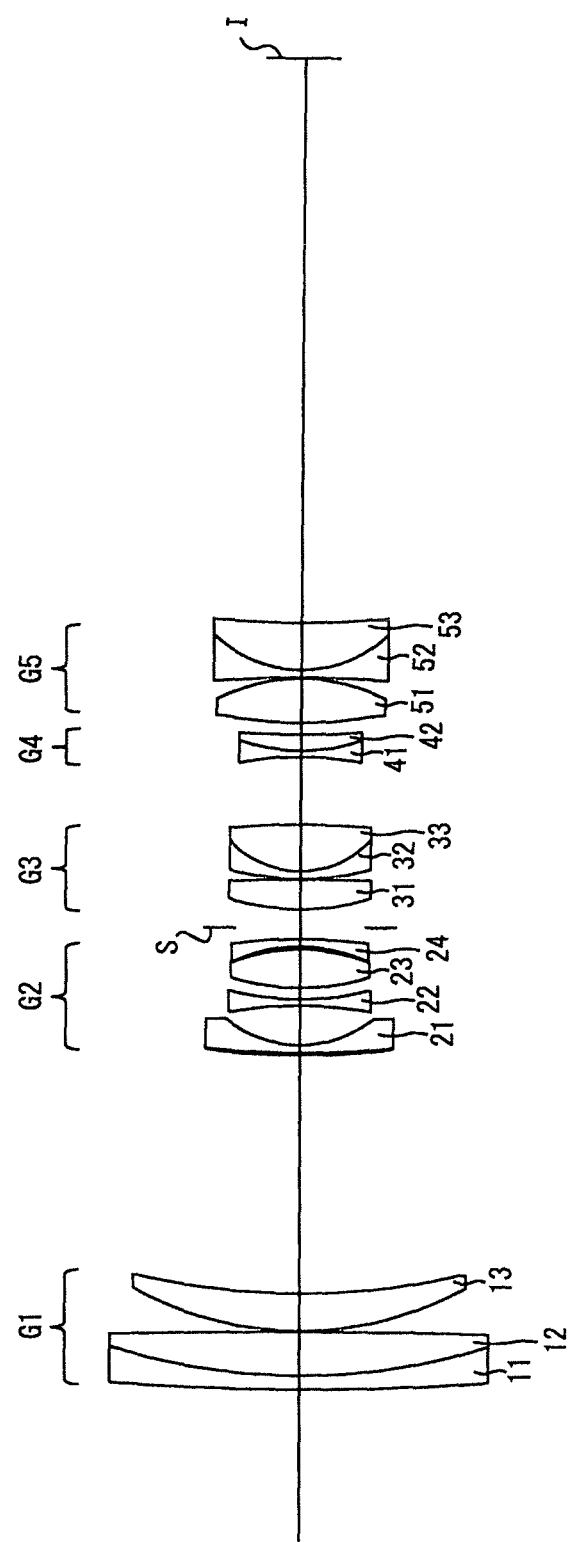
FIG. 4 shows a lens arrangement of the zoom lens system of the first numerical embodiment when focused on an object at infinity at the long focal length extremity.

FIGS. 1 through 6D and Tables 1 through 4 show a first numerical embodiment of the zoom lens system according to the present invention. FIG. 1 shows a lens arrangement of a zoom lens system of the first numerical embodiment when focused on an object at infinity at the short focal length extremity. FIGS. 2A, 2B, 2C and 2D show various aberrations that occurred in the lens arrangement of FIG. 1. FIGS. 3A, 3B, 3C and 3D show lateral aberrations that occurred in the lens arrangement of FIG. 1. FIG. 4 shows the lens arrangement of the zoom lens system of the first numerical embodiment when focused on an object at infinity at the long focal length extremity. FIGS. 5A, 5B, 5C and 5D show various aberrations that occurred in the lens arrangement of FIG. 4. FIGS. 6A, 6B, 6C and 6D show lateral aberrations that occurred in the lens arrangement of FIG. 4. Table 1 shows the lens data, Table 2 shows various data, Table 3 shows aspherical surface data, and Table 4 shows lens-group data.

The zoom lens system of the first numerical embodiment is configured of a positive first lens group G1, a negative second lens group G2, a positive third lens group G3, a negative fourth lens group G4 and a positive fifth lens group G5, in that order from the object side. A diaphragm S is provided between the second lens group G2 and the third lens group G3 (immediately in front of the third lens group G3), and the diaphragm S integrally moves with the third lens group G3 during zooming.

The first lens group G1 is configured of a cemented lens having a negative meniscus lens element 11 having a convex surface on the object side and a biconvex positive lens element 12; and a positive meniscus lens element 13 having a convex surface on the object side, in that order from the object side.

The second lens group G2 is configured of a negative meniscus lens element 21 having a convex surface on the object side, a biconcave negative lens element 22, a biconvex positive lens element 23 and a negative meniscus lens element 24 having a convex surface on the image side, in that order from the object side. The negative meniscus lens element 21 is a hybrid lens configured of a glass lens element with an aspherical surface layer, formed of a synthetic resin material, formed on the object side thereof.

The third lens group G3 is configured of a biconvex positive lens element 31; and a cemented lens having a negative meniscus lens element 32 having a convex surface on the object side and a biconvex positive lens element 33, in that order from the object side.

The fourth lens group G4 is configured of a cemented lens having a biconcave negative lens element 41 and a positive meniscus lens element 42 having a convex surface on the object side.

The fifth lens group G5 is configured of a biconvex positive lens element 51, and a cemented lens having a biconcave negative lens element 52 and a positive meniscus lens element 53 having a convex surface on the object side, in that order from the object side. The biconvex positive lens element 51 is provided with an aspherical surface on each side thereof.

TABLE 1

SURFACE DATA

| Surf. No. | R | d | N(d) | ν(d) |
|---|---|---|---|---|
| 1 | 355.144 | 1.800 | 1.84666 | 23.8 |
| 2 | 82.785 | 5.750 | 1.81600 | 46.6 |
| 3 | −912.971 | 0.100 | | |
| 4 | 45.198 | 4.910 | 1.72916 | 54.7 |
| 5 | 94.377 | d5 | | |
| 6* | 127.598 | 0.320 | 1.52972 | 42.7 |
| 7 | 127.598 | 1.000 | 1.88300 | 40.8 |
| 8 | 15.520 | 5.140 | | |
| 9 | −53.138 | 0.820 | 1.81600 | 46.6 |
| 10 | 37.247 | 1.490 | | |
| 11 | 31.356 | 4.960 | 1.72825 | 28.5 |
| 12 | −25.086 | 0.360 | | |
| 13 | −21.184 | 0.980 | 1.81600 | 46.6 |
| 14 | −69.048 | d14 | | |
| 15 Diaphragm | ∞ | 2.380 | | |
| 16 | 31.375 | 3.880 | 1.72916 | 54.7 |
| 17 | −331.437 | 0.100 | | |
| 18 | 36.614 | 1.000 | 1.64769 | 33.8 |
| 19 | 12.621 | 6.100 | 1.49700 | 81.6 |
| 20 | −114.657 | d20 | | |
| 21 | −42.888 | 0.800 | 1.72916 | 54.7 |
| 22 | 24.730 | 2.100 | 1.84666 | 23.8 |
| 23 | 125.393 | d23 | | |
| 24* | 45.690 | 5.800 | 1.51633 | 64.1 |
| 25* | −22.967 | 0.100 | | |
| 26 | −162.958 | 1.000 | 1.80610 | 33.3 |
| 27 | 16.669 | 6.140 | 1.72916 | 54.7 |
| 28 | 123.804 | — | | |

The asterisk (*) designates an aspherical surface which is rotationally symmetrical with respect to the optical axis.

TABLE 2

VARIOUS LENS-SYSTEM DATA
ZOOM RATIO 3.62

| | Short Focal Length Extremity | Intermediate Focal Length | Long Focal Length Extremity |
|---|---|---|---|
| FNO. | 3.6 | 4.4 | 5.3 |
| f | 28.73 | 55.09 | 103.98 |
| W | 38.2 | 21.0 | 11.5 |
| Y | 21.64 | 21.64 | 21.64 |
| fB | 48.22 | 60.22 | 73.82 |
| L | 136.03 | 153.37 | 173.87 |
| d5 | 2.961 | 17.633 | 31.160 |
| d14 | 17.457 | 8.130 | 1.500 |
| d20 | 1.947 | 6.201 | 8.864 |
| d23 | 8.417 | 4.163 | 1.500 |

TABLE 3

ASPHERICAL SURFACE DATA

| Surf. No. | K | A4 | A6 | A8 | A10 |
|---|---|---|---|---|---|
| 6 | 0.000 | 0.1139E−04 | −0.3323E−08 | −0.6156E−10 | 0.3902E−12 |
| 24 | 0.000 | −0.2058E−04 | 0.4184E−08 | 0.1615E−09 | 0.1248E−12 |
| 25 | 0.000 | 0.1129E−04 | −0.8716E−09 | −0.7529E−10 | 0.1145E−11 |

TABLE 4

LENS GROUP DATA

| Lens Group | 1st Surface | Focal Length |
|---|---|---|
| 1 | 1 | 85.87 |
| 2 | 6 | −16.72 |
| 3 | 16 | 28.98 |
| 4 | 21 | −52.32 |
| 5 | 24 | 53.37 |

Embodiment 2

Figure 10:
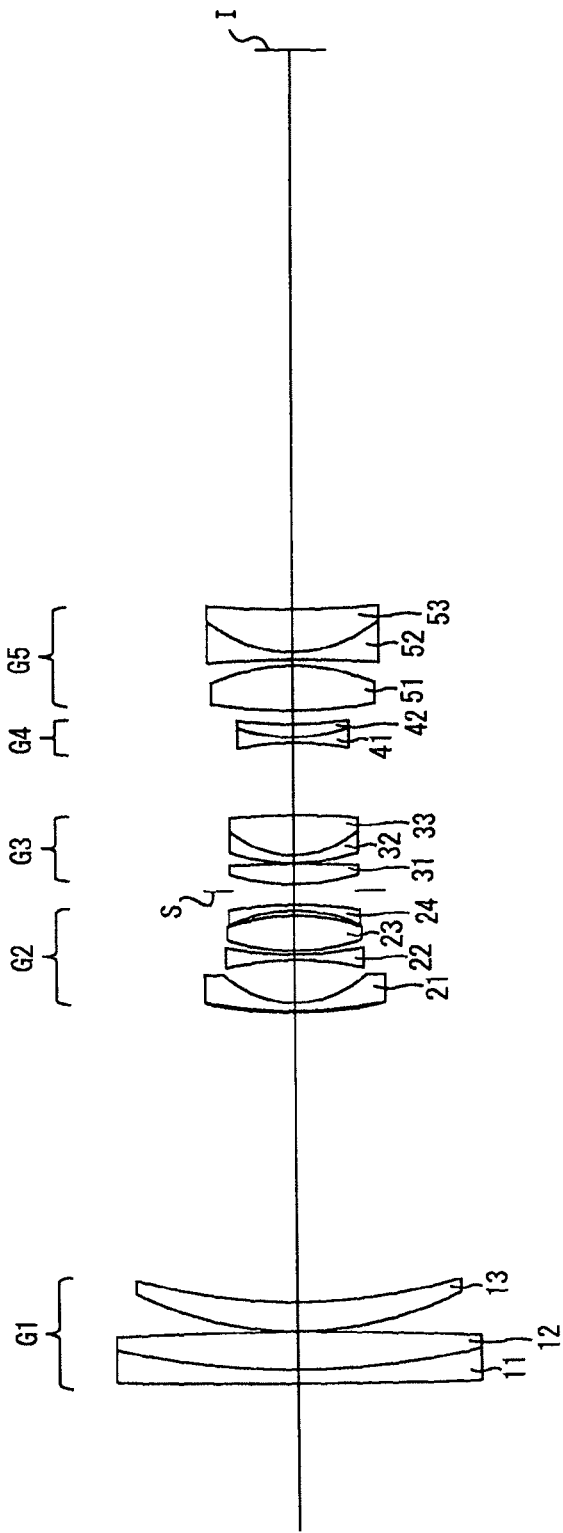
FIG. 10 shows a lens arrangement of the zoom lens system of the second numerical embodiment when focused on an object at infinity at the long focal length extremity.

FIGS. 7 through 12D and Tables 5 through 8 show a second numerical embodiment of the zoom lens system according to the present invention. FIG. 7 shows a lens arrangement of a zoom lens system of the second numerical embodiment when focused on an object at infinity at the short focal length extremity. FIGS. 8A, 8B, 8C and 8D show various aberrations that occurred in the lens arrangement of FIG. 7. FIGS. 9A, 9B, 9C and 9D show lateral aberrations that occurred in the lens arrangement of FIG. 7. FIG. 10 shows the lens arrangement of the zoom lens system of the second numerical embodiment when focused on an object at infinity at the long focal length extremity. FIGS. 11A, 11B, 11C and 11D show various aberrations that occurred in the lens arrangement of FIG. 10. FIGS. 12A, 12B, 12C and 12D show lateral aberrations that occurred in the lens arrangement of FIG. 10. Table 5 shows the lens data, Table 6 shows various data, Table 7 shows aspherical surface data, and Table 8 shows lens-group data.

The lens arrangement of the second numerical embodiment is the same as that of the first numerical embodiment.

TABLE 5

SURFACE DATA

| Surf. No. | R | d | N(d) | ν(d) |
|---|---|---|---|---|
| 1 | 1208.960 | 1.960 | 1.84666 | 23.8 |
| 2 | 110.306 | 5.070 | 1.81600 | 46.6 |
| 3 | −518.616 | 0.100 | | |
| 4 | 49.637 | 3.910 | 1.81600 | 46.6 |
| 5 | 79.494 | d5 | | |
| 6* | 81.778 | 0.150 | 1.52972 | 42.7 |
| 7 | 64.271 | 1.100 | 1.88300 | 40.8 |
| 8 | 14.655 | 5.690 | | |
| 9 | −43.844 | 0.820 | 1.72916 | 54.7 |
| 10 | 47.989 | 0.480 | | |
| 11 | 29.516 | 4.710 | 1.72825 | 28.5 |
| 12 | −29.402 | 0.710 | | |
| 13 | −21.069 | 0.800 | 1.78800 | 47.4 |
| 14 | −58.831 | d14 | | |
| 15 Diaphragm | ∞ | 0.910 | | |
| 16 | 31.214 | 2.750 | 1.69680 | 55.5 |
| 17 | −171.680 | 0.100 | | |
| 18 | 28.446 | 1.040 | 1.80000 | 29.9 |
| 19 | 13.443 | 5.400 | 1.49700 | 81.6 |
| 20 | −100.868 | d20 | | |
| 21 | −39.830 | 0.800 | 1.60311 | 60.7 |
| 22 | 24.992 | 1.720 | 1.84666 | 23.8 |
| 23 | 62.616 | d23 | | |
| 24* | 63.837 | 6.000 | 1.58913 | 61.2 |
| 25* | −25.726 | 0.770 | | |
| 26 | −174.966 | 1.000 | 1.72047 | 34.7 |
| 27 | 18.437 | 5.760 | 1.61800 | 63.4 |
| 28 | 142.496 | — | | |

The asterisk (*) designates an aspherical surface which is rotationally symmetrical with respect to the optical axis.

TABLE 6

VARIOUS LENS-SYSTEM DATA
ZOOM RATIO 3.57

| | Short Focal Length Extremity | Intermediate Focal Length | Long Focal Length Extremity |
|---|---|---|---|
| FNO. | 3.6 | 4.6 | 5.7 |
| f | 28.70 | 54.99 | 102.38 |
| W | 38.1 | 21.1 | 11.7 |
| Y | 21.64 | 21.64 | 21.64 |
| fB | 43.84 | 57.56 | 75.00 |
| L | 128.65 | 150.19 | 179.18 |
| d5 | 3.978 | 21.488 | 38.964 |
| d14 | 17.516 | 7.822 | 1.900 |
| d20 | 2.150 | 6.879 | 9.716 |
| d23 | 9.416 | 4.688 | 1.850 |

TABLE 7

ASPHERICAL SURFACE DATA

| Surf. No. | K | A4 | A6 | A8 | A10 |
|---|---|---|---|---|---|
| 6 | 0.000 | 0.1315E−04 | 0.7792E−08 | −0.1085E−09 | 0.6816E−12 |
| 24 | 0.000 | −0.1280E−04 | −0.1703E−07 | 0.6628E−09 | 0.4269E−12 |
| 25 | 0.000 | 0.9220E−05 | 0.2232E−07 | −0.1534E−09 | 0.3866E−11 |

TABLE 8

LENS GROUP DATA

| Lens Group | 1st Surface | Focal Length |
|---|---|---|
| 1 | 1 | 116.81 |
| 2 | 6 | −18.44 |
| 3 | 16 | 27.54 |
| 4 | 21 | −52.59 |
| 5 | 24 | 53.63 |

Embodiment 3

Figure 13:
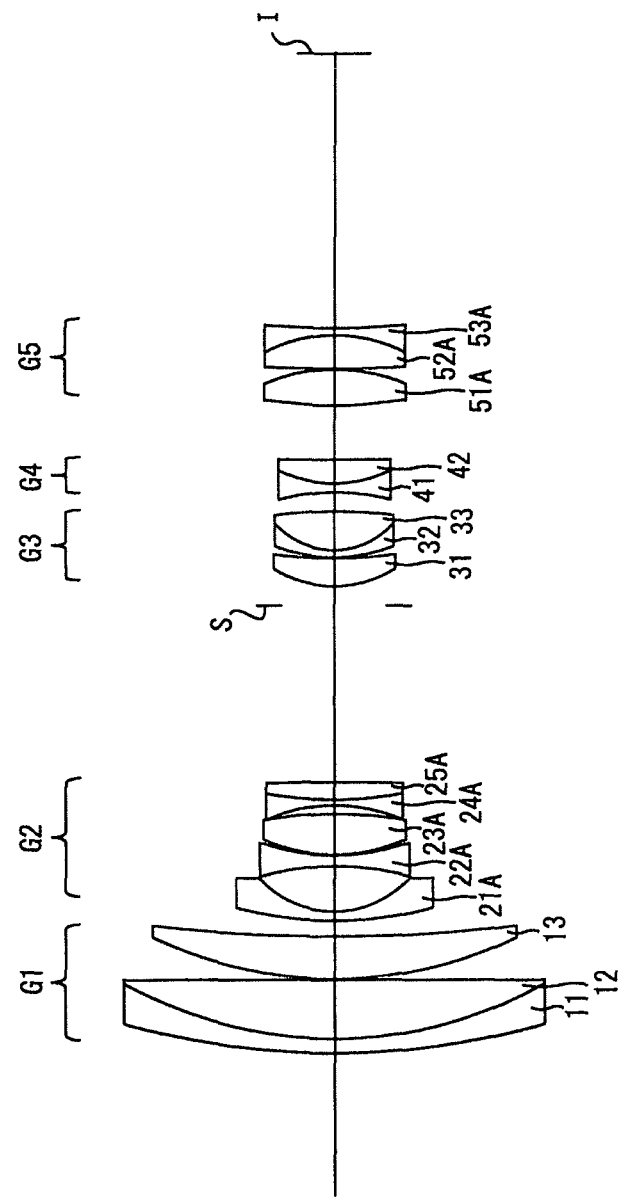
FIG. 13 shows a lens arrangement of a zoom lens system of a third numerical embodiment, according to the present invention, when focused on an object at infinity at the short focal length extremity.
Figure 16:
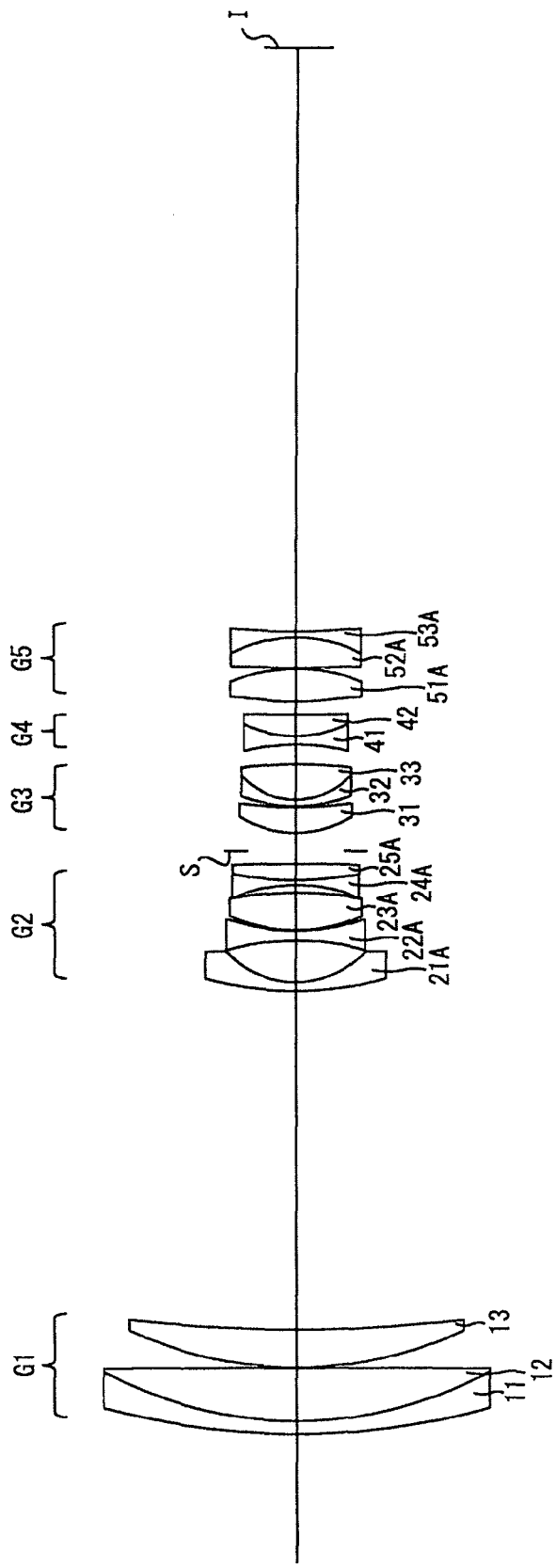
FIG. 16 shows a lens arrangement of the zoom lens system of the third numerical embodiment when focused on an object at infinity at the long focal length extremity.

FIGS. 13 through 18D and Tables 9 through 12 show a third numerical embodiment of the zoom lens system according to the present invention. FIG. 13 shows a lens arrangement of a zoom lens system of the third numerical embodiment when focused on an object at infinity at the short focal, length extremity. FIGS. 14A, 14B, 14C and 14D show various aberrations that occurred in the lens arrangement of FIG. 13. FIGS. 15A, 15B, 15C and 15D show lateral aberrations that occurred in the lens arrangement of FIG. 13. FIG. 16 shows the lens arrangement of the zoom lens system of the third numerical embodiment when focused on an object at infinity at the long focal length extremity. FIGS. 17A, 17B, 17C and 17D show various aberrations that occurred in the lens arrangement of FIG. 16. FIGS. 18A, 18B, 18C and 18D show lateral aberrations that occurred in the lens arrangement of FIG. 16. Table 9 shows the lens data, Table 10 shows various data, Table 11 shows aspherical surface data, and Table 12 shows lens-group data.

The lens arrangement of the third numerical embodiment is the same as those of the first and second numerical embodiments except for the following features:

(1) The second lens group G2 is configured of a negative meniscus lens element 21A having a convex surface on the object side, a biconcave negative lens element 22A, a biconvex positive lens element 23A; and a cemented lens having a biconcave negative lens element 24A and a biconvex positive lens element 25A, in that order from the object side.

(2) The positive lens element 31 of the third lens group G3 is a positive meniscus lens element having an aspherical surface on the image side and a convex surface on the object side.

(3) The fifth lens group G5 is configured of a biconvex positive lens element 51A; and a cemented lens having a biconvex positive lens element 52A and a biconcave negative lens element 53A, in that order from the object side. The biconvex positive lens element 51A is provided with an aspherical surface on each side thereof.

TABLE 9

SURFACE DATA

| Surf. No. | R | d | N(d) | ν(d) |
|---|---|---|---|---|
| 1 | 112.450 | 1.960 | 1.85478 | 24.8 |
| 2 | 61.367 | 8.225 | 1.49700 | 81.6 |
| 3 | −4190.847 | 0.100 | | |
| 4 | 60.029 | 5.948 | 1.74320 | 49.3 |
| 5 | 222.877 | d5 | | |
| 6 | 53.278 | 1.300 | 1.83481 | 42.7 |
| 7 | 14.574 | 6.374 | | |
| 8 | −39.158 | 1.500 | 1.83481 | 42.7 |
| 9 | 31.847 | 0.100 | | |
| 10 | 25.689 | 5.694 | 1.84666 | 23.8 |
| 11 | −57.592 | 1.184 | | |
| 12 | −23.847 | 0.800 | 1.80400 | 46.6 |
| 13 | 56.234 | 2.474 | 1.84666 | 23.8 |
| 14 | −263.337 | d14 | | |
| 15 Diaphragm | ∞ | 2.779 | | |
| 16 | 16.660 | 3.943 | 1.55332 | 71.7 |
| 17* | 88.163 | 0.100 | | |
| 18 | 23.945 | 1.000 | 1.88300 | 40.8 |
| 19 | 11.497 | 5.375 | 1.49700 | 81.6 |
| 20 | −68.734 | d20 | | |
| 21 | −30.574 | 1.260 | 1.74100 | 52.7 |
| 22 | 18.594 | 3.306 | 1.88300 | 40.8 |
| 23 | 1646.635 | d23 | | |
| 24* | 49.347 | 5.057 | 1.49710 | 81.6 |
| 25* | −24.804 | 0.100 | | |
| 26 | 232.936 | 4.651 | 1.64769 | 33.8 |
| 27 | −21.935 | 1.000 | 1.85026 | 32.3 |
| 28 | 116.467 | — | | |

The asterisk (*) designates an aspherical surface which is rotationally symmetrical with respect to the optical axis.

TABLE 10

VARIOUS LENS-SYSTEM DATA
ZOOM RATIO 10.46

| | Short Focal Length Extremity | Intermediate Focal Length | Long Focal Length Extremity |
|---|---|---|---|
| FNO. | 3.6 | 4.8 | 6.3 |
| f | 18.54 | 50.71 | 194.00 |
| W | 39.4 | 15.3 | 4.1 |
| Y | 14.24 | 14.24 | 14.24 |
| fB | 38.41 | 61.12 | 89.34 |
| L | 139.80 | 171.07 | 212.39 |
| d5 | 2.205 | 26.783 | 51.799 |
| d14 | 24.656 | 12.306 | 2.000 |
| d20 | 2.665 | 3.038 | 3.022 |
| d23 | 7.640 | 3.596 | 2.000 |

TABLE 11

ASPHERICAL SURFACE DATA (Aspherical surface coefficients not shown are zero (0.00))

| Surf. No. | K | A4 | A6 | A8 | A10 |
|---|---|---|---|---|---|
| 17 | 0.000 | 0.1177E−04 | 0.2828E−08 | | |
| 24 | 0.000 | −0.2175E−04 | 0.4220E−07 | −0.1076E−08 | |
| 25 | 0.000 | 0.1317E−04 | 0.4759E−07 | −0.8808E−09 | −0.3995E−12 |

TABLE 12

| Lens Group | 1st Surface | Focal Length |
|---|---|---|
| 1 | 1 | 91.11 |
| 2 | 6 | -12.23 |
| 3 | 16 | 26.94 |
| 4 | 21 | -58.73 |
| 5 | 24 | 56.24 |

Embodiment 4

Figure 19:
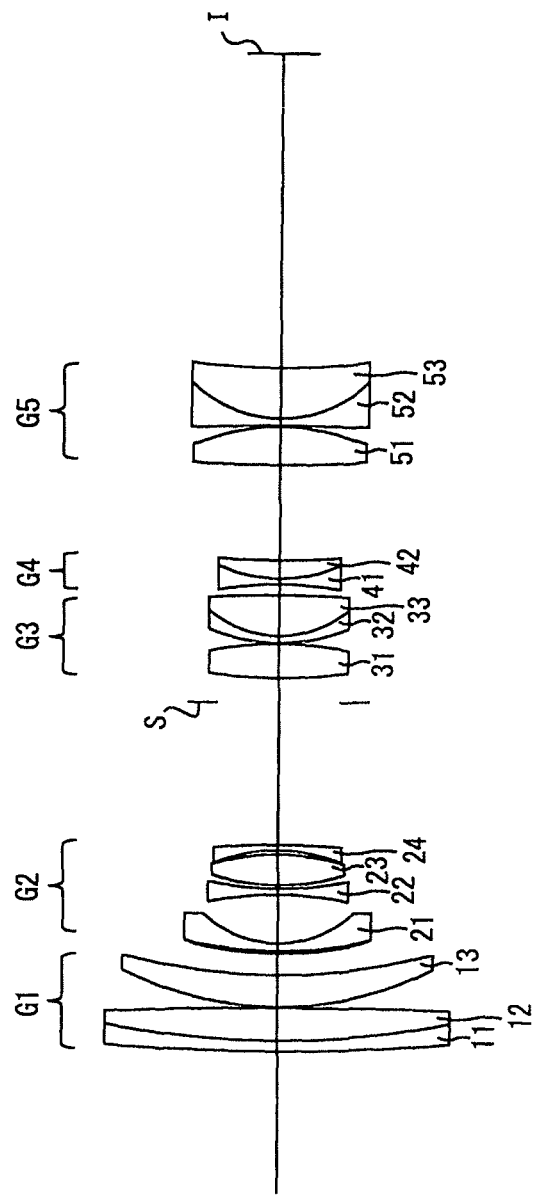
FIG. 19 shows a lens arrangement of a zoom lens system of a fourth numerical embodiment, according to the present invention, when focused on an object at infinity at the short focal length extremity.
Figure 22:
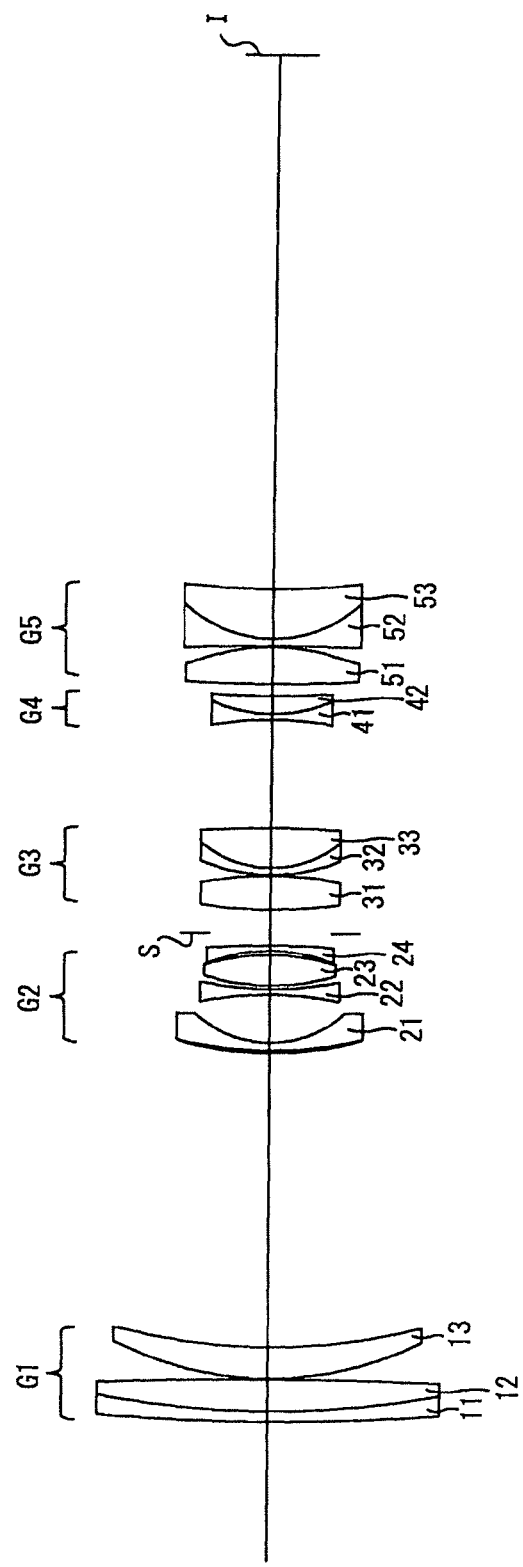
FIG. 22 shows a lens arrangement of the zoom lens system of the fourth numerical embodiment when focused on an object at infinity at the long focal length extremity.

FIGS. 19 through 24D and Tables 13 through 16 show a fourth numerical embodiment of the zoom lens system according to the present invention. FIG. 19 shows a lens arrangement of a zoom lens system of the fourth numerical embodiment when focused on an object at infinity at the short focal length extremity. FIGS. 20A, 20B, 20C and 20D show various aberrations that occurred in the lens arrangement of FIG. 19. FIGS. 21A, 21B, 21C and 21D show lateral aberrations that occurred in the lens arrangement of FIG. 19. FIG. 22 shows the lens arrangement of the zoom lens system of the fourth numerical embodiment when focused on an object at infinity at the long focal length extremity. FIGS. 23A, 23B, 23C and 23D show various aberrations that occurred in the lens arrangement of FIG. 22. FIGS. 24A, 24B, 24O and 24D show lateral aberrations that occurred in the lens arrangement of FIG. 22. Table 13 shows the lens data, Table 14 shows various data, Table 15 shows aspherical surface data, and Table 16 shows lens-group data.

The lens arrangement of the fourth numerical embodiment is the same as those of the first and second numerical embodiments.

TABLE 13

SURFACE DATA

| Surf. No. | R | d | N(d) | ν(d) |
|---|---|---|---|---|
| 1 | 307.486 | 1.500 | 1.84666 | 23.8 |
| 2 | 127.344 | 4.640 | 1.59522 | 67.7 |
| 3 | -647.263 | 0.100 | | |
| 4 | 48.716 | 4.480 | 1.58267 | 46.4 |
| 5 | 85.163 | d5 | | |
| 6* | 59.227 | 0.310 | 1.52972 | 42.7 |
| 7 | 59.227 | 1.100 | 1.91082 | 35.2 |
| 8 | 15.884 | 6.810 | | |
| 9 | -50.331 | 0.820 | 1.74100 | 52.7 |
| 10 | 48.199 | 0.480 | | |
| 11 | 31.509 | 4.340 | 1.80518 | 25.4 |
| 12 | -32.818 | 0.560 | | |
| 13 | -24.028 | 0.800 | 1.88300 | 40.8 |
| 14 | -119.667 | d14 | | |
| 15 Diaphragm | ∞ | 3.430 | | |
| 16 | 70.625 | 4.830 | 1.65160 | 58.5 |
| 17 | -49.323 | 0.100 | | |
| 18 | 26.054 | 1.000 | 1.80518 | 25.4 |
| 19 | 15.742 | 5.710 | 1.49700 | 81.6 |

TABLE 13-continued

SURFACE DATA

| Surf. No. | R | d | N(d) | ν(d) |
|---|---|---|---|---|
| 20 | -152.216 | d20 | | |
| 21 | -50.160 | 0.800 | 1.72342 | 38.0 |
| 22 | 21.570 | 2.570 | 1.84666 | 23.8 |
| 23 | 139.769 | d23 | | |
| 24* | 199.617 | 5.310 | 1.61881 | 63.8 |
| 25* | -28.724 | 0.100 | | |
| 26 | -393.053 | 1.000 | 1.66998 | 39.3 |
| 27 | 18.334 | 7.120 | 1.53775 | 74.7 |
| 28 | 110.225 | — | | |

The asterisk (*) designates an aspherical surface which is rotationally symmetrical with respect to the optical axis.

TABLE 14

VARIOUS LENS-SYSTEM DATA
ZOOM RATIO 3.57

| | Short Focal Length Extremity | Intermediate Focal Length | Long Focal Length Extremity |
|---|---|---|---|
| FNO. | 3.6 | 4.6 | 5.7 |
| f | 28.71 | 55.02 | 102.37 |
| W | 38.1 | 20.9 | 11.6 |
| Y | 21.64 | 21.64 | 21.64 |
| fB | 44.26 | 58.86 | 75.76 |
| L | 139.87 | 158.65 | 194.30 |
| d5 | 3.030 | 18.168 | 41.829 |
| d14 | 19.868 | 7.608 | 1.700 |
| d20 | 1.500 | 10.051 | 15.407 |
| d23 | 13.303 | 6.046 | 1.700 |

TABLE 15

ASPHERICAL SURFACE DATA (Aspherical surface coefficients not shown are zero (0.00))

| Surf. No. | K | A4 | A6 | A8 | A10 |
|---|---|---|---|---|---|
| 6 | 0.000 | 0.7829E-05 | 0.1156E-07 | -0.7323E-10 | 0.3898E-12 |
| 24 | 0.000 | -0.8241E-05 | -0.2821E-07 | 0.5800E-09 | -0.4961E-13 |
| 25 | 0.000 | 0.6429E-05 | -0.4179E-08 | 0.1621E-09 | 0.1427E-11 |

TABLE 16

LENS GROUP DATA

| Lens Group | 1st Surface | Focal Length |
|---|---|---|
| 1 | 1 | 141.70 |
| 2 | 6 | -18.93 |
| 3 | 16 | 27.55 |
| 4 | 21 | -67.38 |
| 5 | 24 | 88.32 |

Embodiment 5

Figure 25:
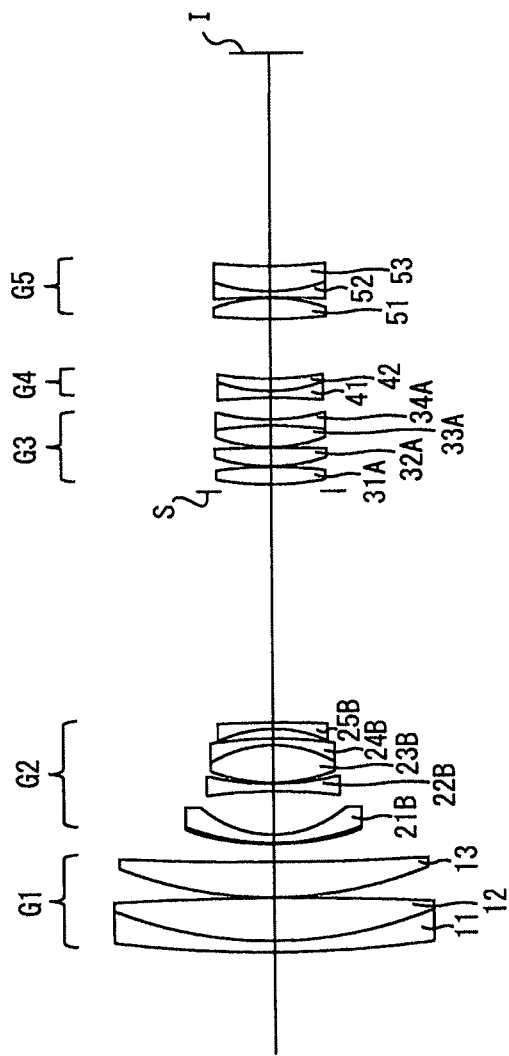
FIG. 25 shows a lens arrangement of a zoom lens system of a fifth numerical embodiment, according to the present invention, when focused on an object at infinity at the short focal length extremity.
Figure 28:
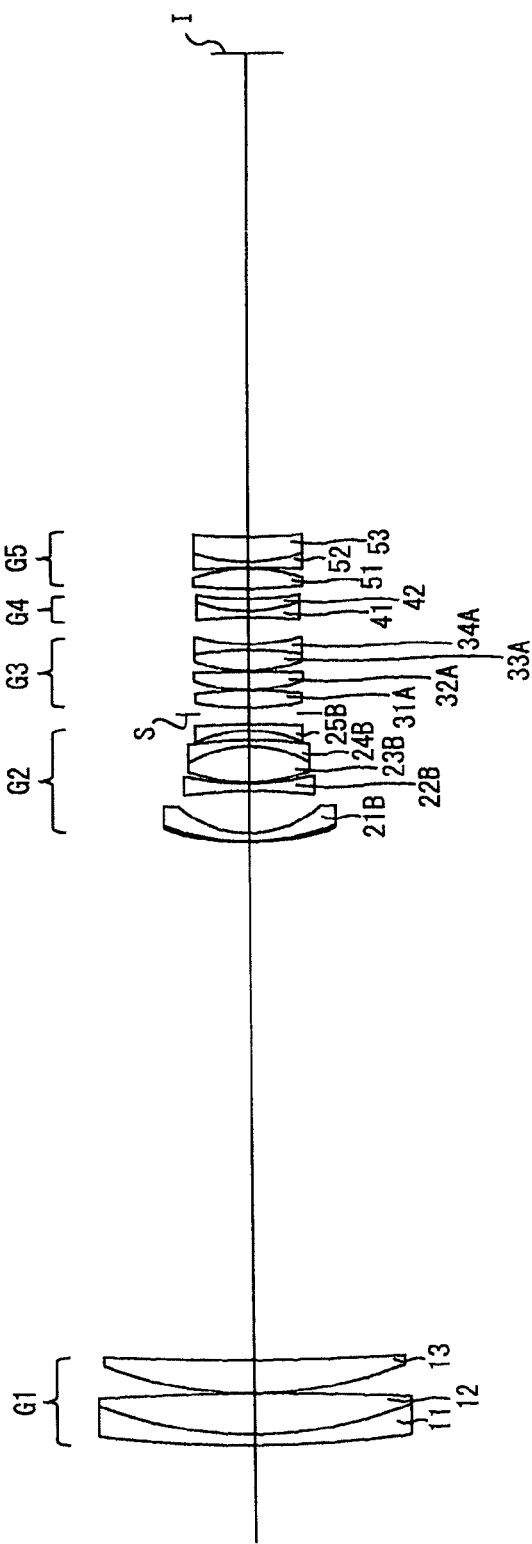
FIG. 28 shows a lens arrangement of the zoom lens system of the fifth numerical embodiment when focused on an object at infinity at the long focal length extremity.

FIGS. 25 through 30D and Tables 17 through 20 show a fifth numerical embodiment of the zoom lens system according to the present invention. FIG. 25 shows a lens arrangement of a zoom lens system of the fifth numerical embodiment when focused on an object at infinity at the short focal length extremity. FIGS. 26A, 26B, 26C and 26D show various aberrations that occurred in the lens arrangement of FIG. 25. FIGS. 27A, 27B, 27C and 27D show lateral aberrations that occurred in the lens arrangement of FIG. 25. FIG. 28 shows the lens arrangement of the zoom lens system of the fifth numerical embodiment when focused on an object at infinity at the long focal length extremity. FIGS. 29A, 29B, 29C and 29D show various aberrations that occurred in the lens arrangement of FIG. 28. FIGS. 30A, 30B, 30C and 30D show lateral aberrations that occurred in the lens arrangement of FIG. 28. Table 17 shows the lens data, Table 18 shows various data, Table 19 shows aspherical surface data, and Table 20 shows lens-group data.

The lens arrangement of the fifth numerical embodiment is the same as those of the first, second and fourth numerical embodiments except for the following features:

(1) The second lens group G2 is configured of a negative meniscus lens element 21B having a convex surface on the object side, a biconcave negative lens element 22B; a cemented lens having a biconvex positive lens element 23B and a negative meniscus lens element 24B having a convex surface on the image side; and a negative meniscus lens element 25B having a convex surface on the image side, in that order from the object side. The negative meniscus lens element 21B is a hybrid lens configured of a glass lens element with an aspherical surface layer, formed of a synthetic resin material, formed on the object side thereof.

(2) The third lens group G3 is configured of a biconvex positive lens element 31A, a biconvex positive lens element 32A; and a cemented lens having a biconvex positive lens element 33A and a biconcave negative lens element 34A, in that order from the object side.

(3) The biconvex positive lens element 51 is provided with an aspherical surface on only the object side thereof rather than on each side.

TABLE 17

SURFACE DATA

| Surf. No. | R | d | N(d) | ν(d) |
|---|---|---|---|---|
| 1 | 259.159 | 2.200 | 1.85150 | 40.8 |
| 2 | 87.212 | 8.370 | 1.49700 | 81.6 |
| 3 | −629.040 | 0.100 | | |
| 4 | 84.516 | 6.870 | 1.59522 | 67.7 |
| 5 | 629.551 | d5 | | |
| 6* | 65.577 | 0.200 | 1.52972 | 42.7 |
| 7 | 49.788 | 1.600 | 1.83400 | 37.2 |
| 8 | 22.339 | 8.460 | | |
| 9 | −108.716 | 1.500 | 1.88300 | 40.8 |
| 10 | 59.068 | 0.200 | | |
| 11 | 35.494 | 7.300 | 1.76182 | 26.5 |
| 12 | −24.217 | 1.300 | 1.83481 | 42.7 |
| 13 | −84.368 | 1.900 | | |
| 14 | −25.933 | 1.300 | 1.69680 | 55.5 |
| 15 | −199.735 | d15 | | |
| 16 Diaphragm | ∞ | 1.400 | | |
| 17 | 61.696 | 3.440 | 1.61800 | 63.4 |
| 18 | −81.978 | 0.100 | | |
| 19 | 35.526 | 3.650 | 1.49700 | 81.6 |
| 20 | −382.332 | 0.150 | | |
| 21 | 32.215 | 4.180 | 1.49700 | 81.6 |
| 22 | −75.340 | 1.200 | 1.80000 | 29.9 |
| 23 | 41.357 | d23 | | |
| 24 | −119.191 | 1.300 | 1.74100 | 52.7 |
| 25 | 31.975 | 2.440 | 1.84666 | 23.8 |
| 26 | 67.247 | d26 | | |
| 27* | 82.546 | 4.140 | 1.61881 | 63.8 |
| 28 | −33.323 | 0.100 | | |
| 29 | −237.949 | 1.200 | 1.63930 | 44.9 |
| 30 | 34.797 | 4.980 | 1.48749 | 70.2 |
| 31 | 107.049 | — | | |

The asterisk (*) designates an aspherical surface which is rotationally symmetrical with respect to the optical axis.

TABLE 18

VARIOUS LENS-SYSTEM DATA
ZOOM RATIO 14.08

| | Short Focal Length Extremity | Intermediate Focal Length | Long Focal Length Extremity |
|---|---|---|---|
| FNO. | 3.5 | 5.1 | 6.2 |
| f | 24.15 | 99.59 | 340.00 |
| W | 31.4 | 8.0 | 2.4 |
| Y | 14.24 | 14.24 | 14.24 |
| fB | 41.90 | 76.00 | 97.65 |
| L | 176.25 | 238.70 | 281.00 |
| d5 | 3.514 | 66.509 | 104.383 |
| d15 | 45.351 | 18.529 | 2.000 |
| d23 | 4.278 | 5.255 | 5.378 |
| d26 | 11.633 | 2.831 | 2.000 |

TABLE 19

ASPHERICAL SURFACE DATA (Aspherical surface coefficients not shown are zero (0.00))

| Surf. No. | K | A4 | A6 | A8 | A10 |
|---|---|---|---|---|---|
| 6 | 0.000 | 0.3514E−05 | 0.1040E−08 | 0.5666E−11 | 0.3331E−13 |
| 27 | 0.000 | −0.1447E−04 | 0.8724E−09 | | |

TABLE 20

LENS GROUP DATA

| Lens Group | 1$^{st}$ Surface | Focal Length |
|---|---|---|
| 1 | 1 | 162.46 |
| 2 | 6 | −21.44 |
| 3 | 17 | 34.87 |
| 4 | 24 | −64.13 |
| 5 | 27 | 67.58 |

Embodiment 6

Figure 34:
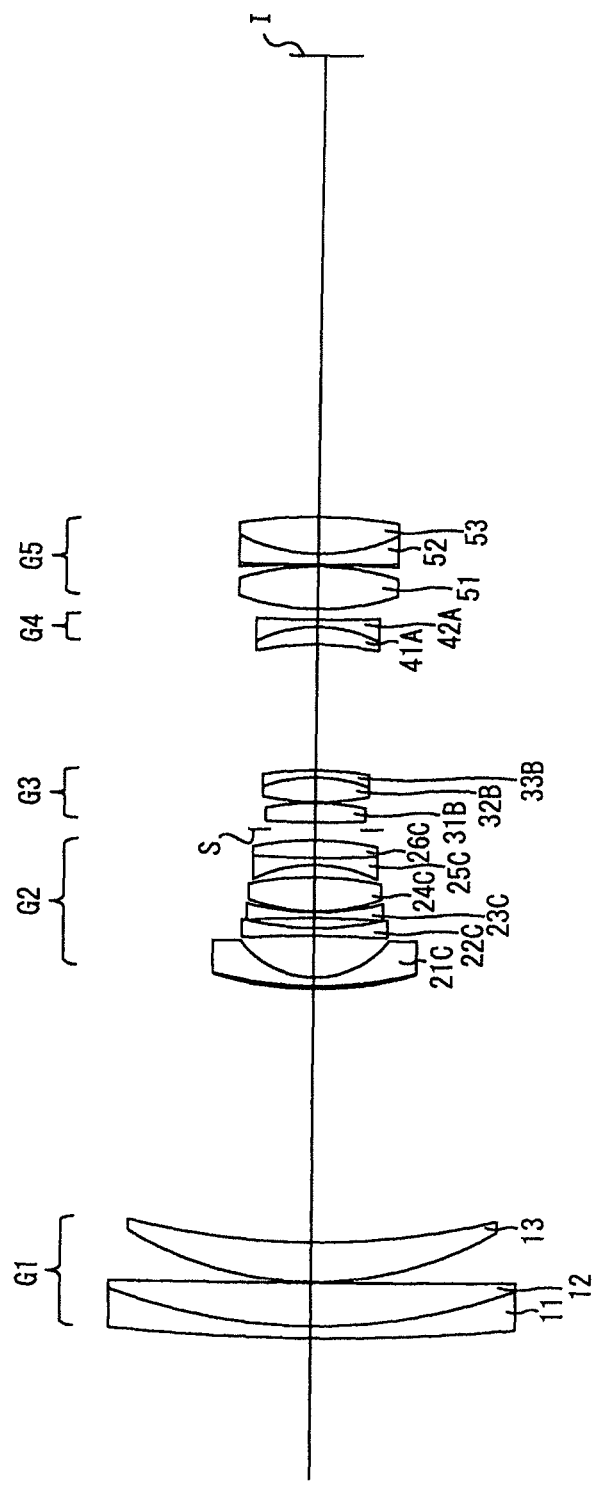
FIG. 34 shows a lens arrangement of the zoom lens system of the sixth numerical embodiment when focused on an object at infinity at the long focal length extremity.

FIGS. 31 through 36D and Tables 21 through 24 show a sixth numerical embodiment of the zoom lens system according to the present invention. FIG. 31 shows a lens arrangement of a zoom lens system of the sixth numerical embodiment when focused on an object at infinity at the short focal length extremity. FIGS. 32A, 32B, 32C and 32D show various aberrations that occurred in the lens arrangement of FIG. 31. FIGS. 33A, 33B, 33C and 33D show lateral aberrations that occurred in the lens arrangement of FIG. 31. FIG. 34 shows the lens arrangement of the zoom lens system of the sixth numerical embodiment when focused on an object at infinity at the long focal length extremity. FIGS. 35A, 35B, 35C and 35D show various aberrations that occurred in the lens arrangement of FIG. 34. FIGS. 36A, 36B, 36C and 36D show lateral aberrations that occurred in the lens arrangement of FIG. 34. Table 21 shows the lens data, Table 22 shows various data, Table 23 shows aspherical surface data, and Table 24 shows lens-group data.

The lens arrangement of the sixth numerical embodiment is the same as those of the first, second and fourth numerical embodiments except for the following features:

(1) The positive lens element 12 of the first lens group G1 is configured of a positive meniscus lens element having a convex surface on the object side.

(2) The second lens group G2 is configured of a negative meniscus lens element 21C having a convex surface on the object side, a biconcave negative lens element 22C, biconcave negative lens element 23C, a biconvex positive lens element 24C; and a cemented lens having a biconcave negative lens element 25C and a biconvex positive lens element 26C, in that order from the object side. The negative meniscus lens element 21C is a hybrid lens configured of a glass lens element with an aspherical surface layer, formed of a synthetic resin material, formed on the object side thereof.

(3) The third lens group G3 is configured of a biconvex positive lens element 31B; and a cemented lens having a biconvex positive lens element 32B and a negative meniscus lens element 33B having a convex surface on the image side, in that order from the object side.

(4) The fourth lens group G4 is a cemented lens having a positive meniscus lens element 41A having a convex surface on the image side and a biconcave negative lens element 42A, in that order from the object side.

(5) In the fifth lens group G5, the biconvex positive lens element 51 has a spherical surface on each side thereof (rather than an aspherical surface), the negative lens element 52 is a negative meniscus lens element having a convex surface on the object side, and the positive lens element is a biconvex positive lens element. The negative meniscus lens element 52 is a hybrid lens configured of a glass lens element with an aspherical surface layer, formed of a synthetic resin material, formed on the object side thereof.

TABLE 21

SURFACE DATA

| Surf. No. | R | d | N(d) | ν(d) |
|---|---|---|---|---|
| 1 | 312.054 | 1.700 | 1.84666 | 23.8 |
| 2 | 83.150 | 6.080 | 1.72916 | 54.7 |
| 3 | 3713.464 | 0.100 | | |
| 4 | 51.484 | 5.500 | 1.81600 | 46.6 |
| 5 | 111.252 | d5 | | |
| 6* | 57.987 | 0.380 | 1.52972 | 42.7 |
| 7 | 57.987 | 1.200 | 1.74100 | 52.7 |
| 8 | 13.301 | 5.800 | | |
| 9 | −182.193 | 1.100 | 1.83481 | 42.7 |
| 10 | 42.265 | 1.410 | | |
| 11 | −131.270 | 0.850 | 1.83481 | 42.7 |
| 12 | 39.619 | 0.100 | | |
| 13 | 27.317 | 4.790 | 1.67270 | 32.1 |
| 14 | −45.189 | 1.730 | | |
| 15 | −19.605 | 1.000 | 1.80400 | 46.6 |
| 16 | 157.471 | 2.470 | 1.84666 | 23.8 |
| 17 | −42.405 | d17 | | |
| 18 Diaphragm | ∞ | 1.000 | | |
| 19 | 117.956 | 2.770 | 1.59522 | 67.7 |
| 20 | −32.503 | 0.100 | | |
| 21 | 37.333 | 3.450 | 1.49700 | 81.6 |
| 22 | −21.787 | 1.000 | 1.85026 | 32.3 |
| 23 | −45.751 | d23 | | |
| 24 | −40.509 | 2.470 | 1.85026 | 32.3 |
| 25 | −19.088 | 1.000 | 1.72916 | 54.7 |
| 26 | 231.691 | d26 | | |
| 27 | 35.536 | 6.000 | 1.53775 | 74.7 |
| 28 | −35.784 | 0.100 | | |
| 29* | 728.467 | 0.150 | 1.52972 | 42.7 |
| 30 | 728.467 | 1.500 | 1.85026 | 32.3 |
| 31 | 26.260 | 5.170 | 1.48749 | 70.2 |
| 32 | −67.178 | — | | |

The asterisk (*) designates an aspherical surface which is rotationally symmetrical with respect to the optical axis.

TABLE 22

VARIOUS LENS-SYSTEM DATA
ZOOM RATIO 3.88

| | Short Focal Length Extremity | Intermediate Focal Length | Long Focal Length Extremity |
|---|---|---|---|
| FNO. | 3.5 | 4.5 | 5.5 |
| f | 17.50 | 35.17 | 67.89 |
| W | 40.4 | 21.8 | 11.6 |
| Y | 14.24 | 14.24 | 14.24 |
| fB | 38.03 | 51.13 | 64.54 |
| L | 136.88 | 152.70 | 179.51 |
| d5 | 2.482 | 17.752 | 35.452 |
| d17 | 14.200 | 5.548 | 1.512 |
| d23 | 3.500 | 11.977 | 17.590 |
| d26 | 19.749 | 7.381 | 1.500 |

TABLE 23

ASPHERICAL SURFACE DATA (Aspherical surface coefficients not shown are zero (0.00))

| Surf. No. | K | A4 | A6 | A8 |
|---|---|---|---|---|
| 6 | 0.000 | 0.9587E−05 | −0.2197E−07 | 0.5434E−10 |
| 29 | 0.000 | −0.1816E−04 | −0.1419E−07 | |

TABLE 24

LENS GROUP DATA

| Lens Group | 1$^{st}$ Surface | Focal Length |
|---|---|---|
| 1 | 1 | 100.64 |
| 2 | 6 | −12.02 |
| 3 | 19 | 26.12 |
| 4 | 24 | −56.41 |
| 5 | 27 | 41.76 |

Embodiment 7

Figure 37:
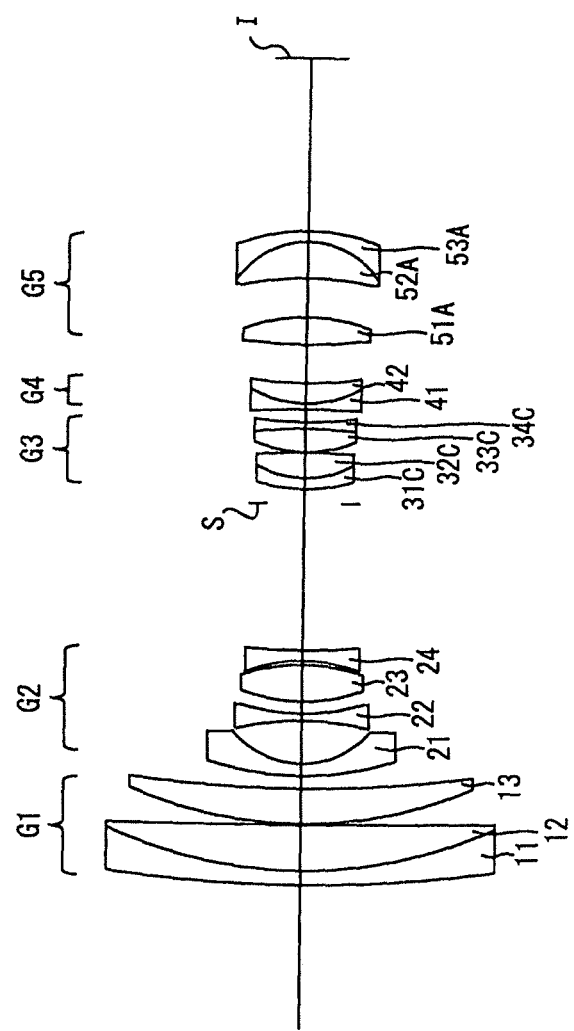
FIG. 37 shows a lens arrangement of a zoom lens system of a seventh numerical embodiment, according to the present invention, when focused on an object at infinity at the short focal length extremity.
Figure 40:
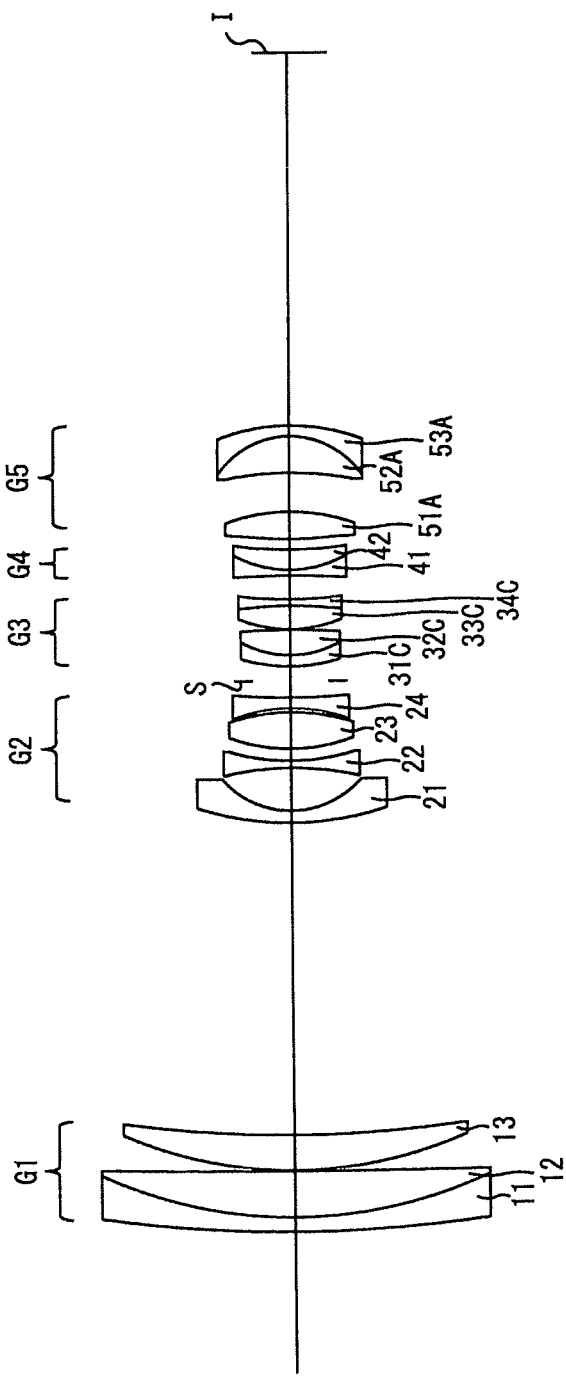
FIG. 40 shows a lens arrangement of the zoom lens system of the seventh numerical embodiment when focused on an object at infinity at the long focal length extremity.

FIGS. 37 through 42D and Tables 25 through 28 show a seventh numerical embodiment of the zoom lens system according to the present invention. FIG. 37 shows a lens arrangement of a zoom lens system of the seventh numerical embodiment when focused on an object at infinity at the short focal length extremity. FIGS. 38A, 38B, 38C and 38D show various aberrations that occurred in the lens arrangement of FIG. 37. FIGS. 39A, 39B, 39C and 39D show lateral aberrations that occurred in the lens arrangement of FIG. 37. FIG. 40 shows the lens arrangement of the zoom lens system of the seventh numerical embodiment when focused on an object at infinity at the long focal length extremity. FIGS. 41A, 41B, 41C and 41D show various aberrations that occurred in the lens arrangement of FIG. 40. FIGS. 42A, 42B, 42C and 42D show lateral aberrations that occurred in the lens arrangement of FIG. 40. Table 25 shows the lens data, Table 26 shows various data, Table 27 shows aspherical surface data, and Table 28 shows lens-group data.

The lens arrangement of the seventh numerical embodiment is the same as those of the first, second and fourth numerical embodiments except for the following features:

(1) The positive lens element 12 of the first lens group G1 is a positive meniscus lens element having a convex surface on the object side.

(2) The negative meniscus lens element 21 of the second lens group G2 is a non-hybrid lens element having a spherical surface on each side thereof.

(3) The third lens group G3 is configured of a cemented lens having a negative meniscus lens element 31C having a convex surface on the object side and a biconvex positive lens element 32C; and a cemented lens having a biconvex positive lens element 33C and a biconcave negative lens element 34C, in that order from the object side.

(4) The fifth lens group G5 is configured of a biconvex positive lens element 51A; and a cemented lens having a positive meniscus lens element 52A having a convex surface on the image side and a negative meniscus lens element 53A having a convex surface on the image side, in that order from the object side. An aspherical surface is formed on each side of the biconvex positive lens element 51.A.

TABLE 25

SURFACE DATA

| Surf. No. | R | d | N(d) | ν(d) |
|---|---|---|---|---|
| 1 | 195.880 | 2.000 | 1.84666 | 23.8 |
| 2 | 66.236 | 6.418 | 1.61800 | 63.4 |
| 3 | 1731.861 | 0.100 | | |
| 4 | 60.993 | 4.955 | 1.83400 | 37.2 |
| 5 | 177.413 | d5 | | |
| 6 | 42.812 | 1.700 | 1.83481 | 42.7 |
| 7 | 12.897 | 6.016 | | |
| 8 | −41.434 | 1.000 | 1.81600 | 46.6 |
| 9 | 30.351 | 1.681 | | |
| 10 | 25.069 | 5.106 | 1.75520 | 27.5 |
| 11 | −27.403 | 0.513 | | |
| 12 | −22.894 | 1.523 | 1.65160 | 58.5 |
| 13 | 104.642 | d13 | | |
| 14 Diaphragm | ∞ | 2.071 | | |
| 15 | 24.694 | 1.545 | 1.83400 | 37.2 |
| 16 | 14.183 | 3.566 | 1.69350 | 53.2 |
| 17 | −105.065 | 0.100 | | |
| 18 | 19.304 | 3.267 | 1.49700 | 81.6 |
| 19 | −59.248 | 0.900 | 1.84666 | 23.8 |
| 20 | 56.617 | d20 | | |
| 21 | −114.022 | 0.800 | 1.72000 | 50.2 |
| 22 | 16.363 | 2.847 | 1.80000 | 29.9 |
| 23 | 57.572 | d23 | | |
| 24* | 51.996 | 3.809 | 1.55332 | 71.7 |
| 25* | −26.843 | 5.454 | | |
| 26 | −45.515 | 5.085 | 1.49700 | 81.6 |
| 27 | −12.268 | 1.500 | 1.83481 | 42.7 |
| 28 | −27.991 | — | | |

The asterisk (*) designates an aspherical surface which is rotationally symmetrical with respect to the optical axis.

TABLE 26

VARIOUS LENS-SYSTEM DATA
ZOOM RATIO 4.76

| | Short Focal Length Extremity | Intermediate Focal Length | Long Focal Length Extremity |
|---|---|---|---|
| FNO. | 4.0 | 5.0 | 6.1 |
| f | 16.40 | 33.53 | 78.00 |
| W | 42.6 | 22.7 | 10.2 |
| Y | 14.24 | 14.24 | 14.24 |
| fB | 24.05 | 37.71 | 52.22 |
| L | 115.42 | 132.80 | 164.89 |
| d5 | 1.790 | 18.436 | 43.555 |
| d13 | 20.444 | 9.086 | 2.288 |
| d20 | 1.800 | 2.970 | 3.364 |
| d23 | 5.376 | 2.650 | 1.500 |

TABLE 27

ASPHERICAL SURFACE DATA

| Surf. No. | K | A4 | A6 | A8 |
|---|---|---|---|---|
| 24 | 0.000 | −0.3712E−04 | −0.9621E−07 | 0.7962E−09 |
| 25 | 0.000 | −0.3986E−05 | −0.1063E−06 | 0.7354E−09 |

TABLE 28

LENS GROUP DATA

| Lens Group | 1$^{st}$ Surface | Focal Length |
|---|---|---|
| 1 | 1 | 104.06 |
| 2 | 6 | −13.99 |
| 3 | 15 | 26.65 |
| 4 | 21 | −65.03 |
| 5 | 24 | 42.47 |

The values of each condition of each numerical embodiment are shown in Table 29.

TABLE 29

| | Embod. 1 | Embod. 2 | Embod. 3 | Embod. 4 |
|---|---|---|---|---|
| Cond. (1) | 1.61 | 2.18 | 1.62 | 1.604 |
| Cond. (2) | −1.81 | −1.91 | −2.18 | −2.45 |
| Cond. (2') | −1.81 | −1.91 | −2.18 | −2.45 |

| | Embod. 5 | Embod. 6 | Embod. 7 |
|---|---|---|---|
| Cond. (1) | 2.40 | 2.41 | 2.45 |
| Cond. (2) | −1.84 | −2.16 | −2.44 |
| Cond. (2') | −1.84 | −2.16 | −2.44 |

As can be understood from Table 29, the first through seventh embodiments satisfy conditions (1) and (2), and the first through third, fifth and sixth embodiments satisfy condition (2'). Furthermore, as can be understood from the aberration diagrams, the various aberrations are suitably corrected.

Even if a lens element or lens group having effectively no refractive power were to be added to the zoom lens system included in the scope of the clams of the present invention, such a zoom lens system would still remain within the technical scope of the present invention (and would not be excluded from the technical scope of the present invention).

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A zoom lens system comprising a positive first lens group, a negative second lens group, a positive third lens group, a negative fourth lens group, and a positive fifth lens group, in that order from the object side,
    wherein upon zooming from the short focal length extremity to the long focal length extremity, at least said first lens group, said third lens group and said fifth lens group move in the optical axis direction,
    wherein said second lens group includes at least four lens elements,
    wherein said third lens group includes a plurality of lens elements, wherein said fourth lens group includes a plurality of lens elements, wherein said fifth lens group includes a plurality of lens elements, and wherein the following conditions (1) and (2) are satisfied:

$$1.60 < f1/f5 < 2.46 \quad (1), \text{ and}$$

$$-2.46 < f4/f3 < -1.80 \quad (2), \text{ wherein}$$

f1 designates the focal length of said first lens group, f3 designates the focal length of said third lens group, f4 designates the focal length of said fourth lens group, and f5 designates the focal length of said fifth lens group.

2. The zoom lens system according to claim 1, wherein said second lens group comprises a negative lens element, a negative lens element, a positive lens element, and a negative lens element, in that order from the object side.

3. The zoom lens system according to claim 1, wherein said second lens group comprises a negative lens element, a negative lens element, a positive lens element, a negative lens element, and a positive lens element, in that order from the object side.

4. The zoom lens system according to claim 1, wherein said second lens group comprises a negative lens element, a negative lens element, a positive lens element, a negative lens element, and a negative lens element, in that order from the object side.

5. The zoom lens system according to claim 1, wherein said second lens group comprises a negative lens element, a negative lens element, a negative lens element, a positive lens element, a negative lens element, and a positive lens element, in that order from the object side.

6. The zoom lens system according to claim 1, wherein the following condition (2') is satisfied:

$$-2.20 < f4/f3 < -1.80 \quad (2'),$$

f3 designates the focal length of said third lens group, and f4 designates the focal length of said fourth lens group.

7. The zoom lens system according to claim 1, wherein said second lens group comprises a negative hybrid lens, provided closest to the object side within said second lens group, said hybrid lens including a glass lens element with an aspherical surface layer, formed of a synthetic resin material, formed on the object side thereof.

8. The zoom lens system according to claim 1, wherein said fourth lens group comprises a cemented lens having a positive lens element and a negative lens element.

* * * * *